US006992841B2

(12) United States Patent  
Saito et al.

(10) Patent No.: US 6,992,841 B2  
(45) Date of Patent: Jan. 31, 2006

(54) IMAGING LENS SYSTEM

(75) Inventors: Tomohiro Saito, Kawaguchi (JP); Isamu Kaneko, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/727,464

(22) Filed: Dec. 4, 2003

(65) Prior Publication Data

US 2004/0136098 A1 Jul. 15, 2004

(30) Foreign Application Priority Data

| Dec. 6, 2002 | (JP) | ............................. 2002-354971 |
| Dec. 16, 2002 | (JP) | ............................. 2002-363401 |
| Oct. 31, 2003 | (JP) | ............................. 2003-372037 |

(51) Int. Cl.  
*G02B 9/06* (2006.01)  
*G02B 9/04* (2006.01)

(52) U.S. Cl. .................................... 359/794; 359/793
(58) Field of Classification Search ................ 359/717, 359/793, 794, 795
See application file for complete search history.

(56) References Cited

U.S. PATENT DOCUMENTS

| 5,000,552 | A | 3/1991 | Simpson, Jr. et al. ....... 359/740 |
| 5,166,830 | A | 11/1992 | Ishibai et al. ................ 359/717 |
| 5,677,798 | A | 10/1997 | Hirano et al. ................ 359/717 |
| 6,335,835 | B1 | 1/2002 | Koike ......................... 359/717 |

FOREIGN PATENT DOCUMENTS

EP 1426805 A1 * 6/2004

* cited by examiner

*Primary Examiner*—David N. Spector  
(74) *Attorney, Agent, or Firm*—Koda & Androlia

(57) ABSTRACT

An imaging lens system includes a first lens 2 which is a meniscus lens with its convex face turned toward the object side and having a positive power, a diaphragm 3, and a second lens 4 which is a meniscus lens with its concave face turned toward the object side. The first lens 2, the diaphragm 3 and the second lens 4 are disposed sequentially in the named order from the side of the object toward an image surface. In the imaging lens system, the following conditional expressions are satisfied: $1.25 \times fl \geq L \geq 0.8 \times fl$; $1.26 \times fl \geq f_1 \geq 0.85 \times fl$; $0.8 \times d_1 \geq d_2 \geq 0.35 \times d_1$; $L \leq 6.25$ mm; $d_1 \geq 0.225 \times fl$; and $d_3 \geq 0.225 \times fl$, wherein L is a distance of the entire length of the lens system; fl is a focal length of the entire lens system; $f_1$ is a focal length of the first lens; $d_1$ is a thickness of the center of the first lens; $d_2$ is a distance between the first and second lenses; and $d_3$ is a thickness of the center of the second lens.

12 Claims, 25 Drawing Sheets

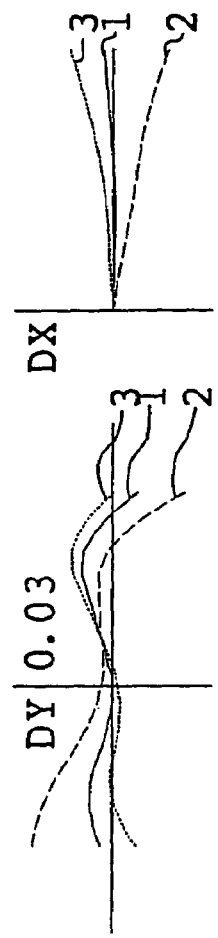
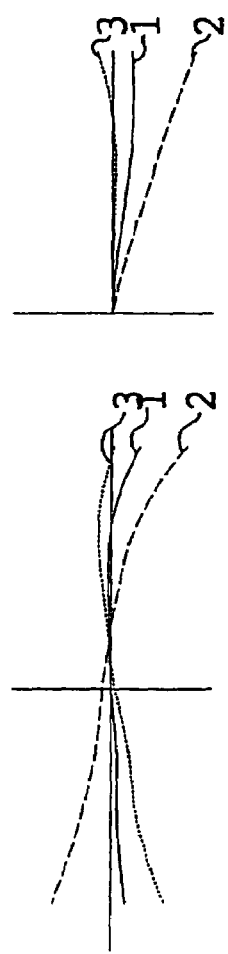
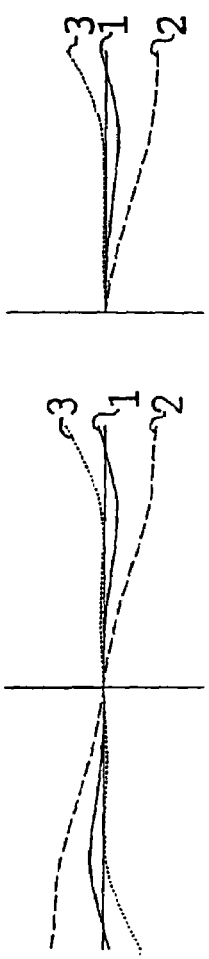
FIG. 14

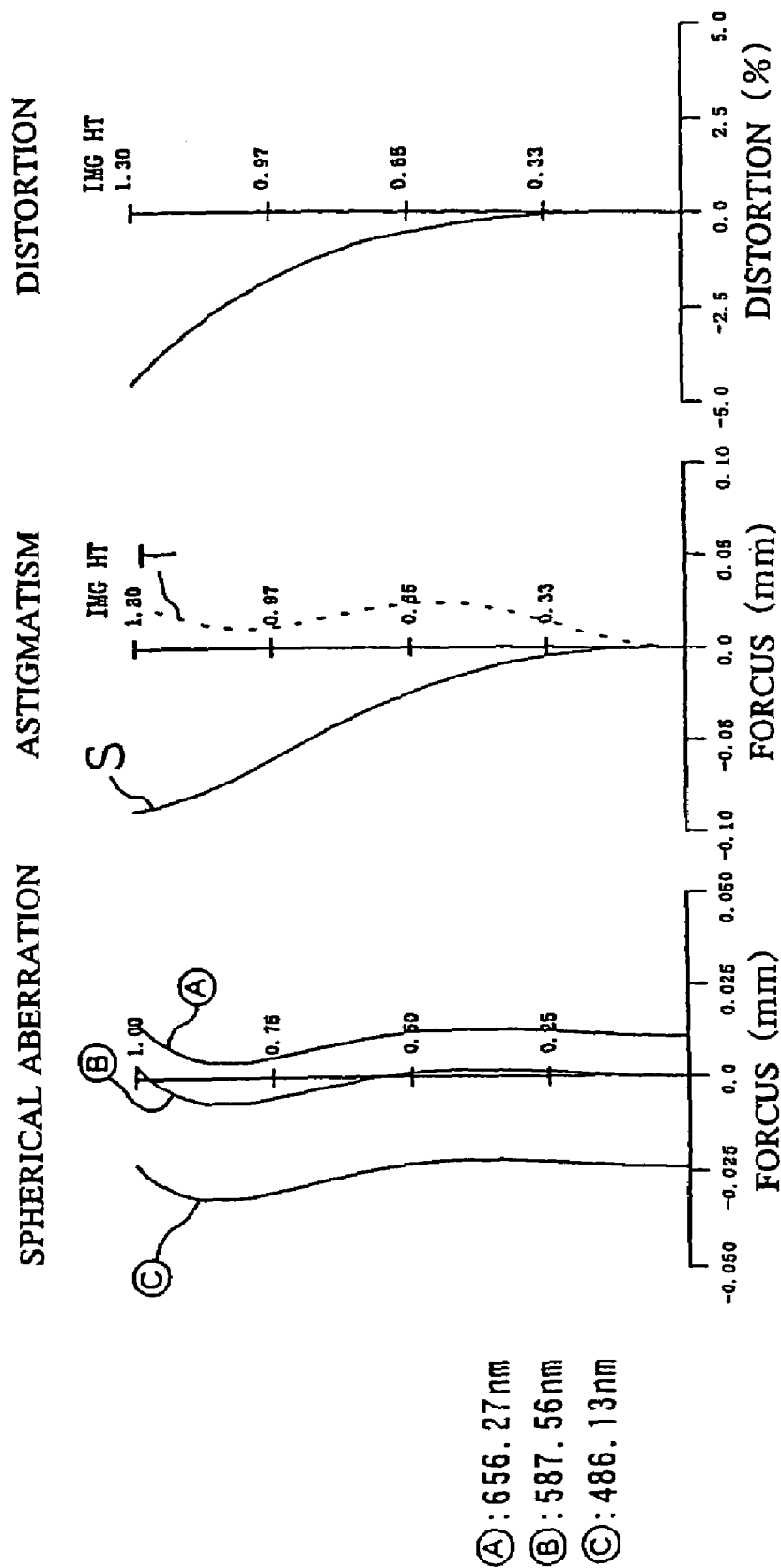

IMAGING LENS SYSTEM

BACKGROUND OF THE INVENTION

1. Field of the Invention

The present invention relates to an imaging lens system and particularly, to an imaging lens system comprising two lenses made of a resin, which is used in an image taking device for forming an image of an object such as a landscape and a person on an image taking surface of a solid image sensor element such as CCD, CMOS and the like mounted on a portable computer, a visual telephone, a mobile telephone and the like, and which is capable of being made at reduced size and weight and with an enhanced productivity.

2. Description of the Related Art

In recent years, the demand for a camera utilizing a solid image sensor element such as CCD, CMOS and the like adapted to be mounted, for example, in a portable computer, a visual telephone, a mobile telephone or the like has been increased remarkably. It is desired that such a camera is small-sized and lightweight, because the camera is required to be mounted in a limited space.

Therefore, it is desired that an imaging lens system used in such a camera is likewise small-sized and lightweight. A lens system of a single-lens arrangement is conventionally as such an imaging lens system.

Such a lens system of a single-lens arrangement is acceptable sufficiently to be applied to a solid image sensor element called CIF and having a resolution on the order of about 110,000 pixels, but in recent years, it has been reviewed to utilize a solid image sensor element called VGA and having a resolution as high as about 300,000 pixels. However, when the resolving ability of a solid image sensor element having such a high resolution is intended to be exhibited sufficiently, this is not acceptable in the conventional lens system of the single-lens arrangement.

Therefore, there are various types of conventionally proposed lens systems of a two-lens arrangement or a three-lens arrangement, which are excellent in an optical performance, as compared with the lens system of the single-lens arrangement.

In the lens system of the three-lens arrangement, it is possible to effectively correct aberrations resulting in a reduction in optical performance and therefore, it is possible to provide an extremely high optical performance. However, the lens system of the three-lens arrangement suffers from a problem that it is difficult to reduce the size and weight of the lens system because of an increased number of parts, and the manufacture cost is higher, because a high accuracy is required for each of components.

On the contrast, in the lens system of the two-lens arrangement, it is impossible to desire an optical performance as high as that of the lens system of the three-lens arrangement, but it is possible to provide an optical performance higher than that of the lens system of the single-lens arrangement. Therefore, it may be mentioned safely that the lens system of the two-lens arrangement is a lens system suitable for a solid image sensor element having a small size and a high resolution.

There are also a large number of conventionally proposed lens systems of two-lens arrangement called a retro-focus type and comprising a combination of negative and positive lenses. In such lens system of the retro-focus type, however, it is possible to reduce the cost by decreasing the number of parts, but it is substantially impossible from the viewpoint of the construction to reduce the size and weight of the lens system to the same extent as the lens system of the single-lens arrangement, because the back focal length is increased.

There is another lens system of a two-lens arrangement called a telephoto type and comprising a combination of positive and negative lenses. However, such lens system has been developed intrinsically for a silver-salt photograph, and suffers from a problem of a back focal length too short and a problem in a telecetric property. For these reasons, it is difficult to utilize this lens system of the telephoto type, as it is, as an imaging lens system for a solid image sensor element.

There are also conventionally proposed lens systems of two-lens arrangements each comprising a combination of two positive lenses (for example, see the following patent documents 1 to 9).

Patent Document 1: Japanese Patent Application Laid-open No.7-181379

Patent Document 2: Japanese Patent Application Laid-open No.7-287164

Patent Document 3: Japanese Patent Application Laid-open No.10-206725

Patent Document 4: Japanese Patent Application Laid-open No.2000-72079

Patent Document 5: Japanese Patent No.3311317

Patent Document 6: Japanese Patent Application Laid-open No.7-151962

Patent Document 7: Japanese Patent No.3027863

Patent Document 8: Japanese Patent Application Laid-open No.2001-183578

Patent Document 9: Japanese Patent Application Laid-open No.2002-267928

However, all of the imaging lens systems described in the patent documents 1 to 3 have been developed for a silver-salt photograph or for an optical system such as a duplicator and a facsimile unit. For this reason, each of these imaging lens systems suffers from a problem that it is a lens system having an extremely low brightness, a focal length as extremely long as 20 mm or more and Fno equal to or larger than 4.0. Further, each of these imaging lens systems has a problem that it has a very large entire length and cannot be applied, as it is, to a small-sized image taking device using a solid image sensor element mounted in a mobile telephone or the like. Each of the imaging lens system described in the patent documents 6 and 7 cannot be applied, as it is, for a solid image sensor element for similar reason.

Each of the imaging lens systems described in the patent documents 4 and 5 is an imaging lens system applicable to a solid image sensor element, but is not suited to be reduced in size and weight, because its entire length is too large. In addition, each of these imaging lens systems has the following problem: From the view point of a productivity such as a moldability, an assembling accuracy, a working accuracy for making a mold for the imaging lens and an accuracy for measuring a mold and a product, it may not be mentioned safely that the imaging lens system is good. Each of the imaging lens systems described in the patent documents 8 and 9 is also not suited to be reduced in size and weight for a similar reason.

Especially, the demand for reductions in size and weight and for an enhancement in productivity of an imaging lens system is being more and more increased in recent years, but it is a real situation that it is impossible in the conventional imaging lens systems to sufficiently meet such demand.

There is another proposed an optical system made using a glass material. In this optical system, excellent optical characteristics possessed by an optical system made using a glass material can be utilized, but on the other hand, it is impossible to meet a demand for an optical system made at a low cost and with a good productivity, which are required for an optical system used in an image taking device mounted in a mobile telephone or the like.

The term "good productivity" used in the present specification means that the productivity for mass production of an imaging lens system is good (for example, the moldability for mass production of an imaging lens system is good), and also means that it is easy to work and fabricate an equipment used for producing an imaging lens system (for example, it is easy to work a mold used in an injection molding).

SUMMARY OF THE INVENTION

Accordingly, it is an object of the present invention to provide an imaging lens system wherein reductions in size and weight and an enhancement in productivity can be achieved, while maintaining an optical performance.

To achieve the above object, according to a first aspect and feature of the present invention, there is provided an imaging lens system used for forming an image of an object on an image taking surface of a solid image sensor element, comprising a first lens which is a meniscus lens with its convex face turned toward the object side and having a positive power, a diaphragm, and a second lens which is a meniscus lens with its concave face turned toward the object side, the first lens, the diaphragm and the second lens being disposed sequentially in the named order from the side of the object toward an image surface.

According to a second aspect and feature of the present invention, there is provided an imaging lens system comprising a first lens which is a meniscus lens with its convex face turned toward the object and having a positive power, and which has a main power, a diaphragm, and a second lens which is a meniscus lens with its concave face turned toward the object, the first lens, the diaphragm and the second lens being disposed sequentially in the named order from the side of the object toward an image surface, and wherein the following conditional expressions (1) and (2) are satisfied:

$$d_2/fl < 0.1 \quad (1)$$

$$-4.0 < \Phi_{air}/\Phi < -2.5 \quad (2)$$

wherein $d_2$ is a distance on an optical axis between the first and second lenses; fl is a focal length of the entire lens system; $\Phi$ is a power of the entire lens system; $\Phi_{air}$ is a power of an air lens comprising air existing between the first and second lenses [if a curvature of a face of the first lens on the side of the image surface is represented by $c_2$; a curvature of a face of the second lens on the side of the object is represented by $C_3$; a refraction index of the first lens for refraction of light having a wavelength used in design is represented by $n_1$; and a refraction index of the second lens for refraction of light having a wavelength used in design is represented by $n_3$, $\Phi_{air}$ is represented by $\Phi_{air} = c_2(1-n_1) + c_3(n_3-1) + c_2 c_3 (n_1-1)(n_3-1)d_2$].

In the imaging lens system, the following conditional expression (3) is satisfied:

$$0.4 < (d_1+d_2+d_3)/fl < 0.7 \quad (3)$$

wherein $d_1$ is a thickness of the center of the first lens, and $d_3$ is a thickness of the center of the second lens.

According to a third aspect and feature of the present invention, there is provided an imaging lens system used for forming an image of an object on an image taking surface of a solid image sensor element, comprising a first lens made of a resin, which is a meniscus lens with its convex face turned toward the object side and having a positive power, a diaphragm, and a second lens made of a resin, which is a meniscus lens with its convex face turned toward an image surface side, the first lens, the diaphragm and the second lens being disposed sequentially in the named order from the side of the object toward the image surface, and wherein the following conditional expressions (4) to (9) are satisfied:

$$1.25 \times fl \geq L \geq 0.8 \times fl \quad (4)$$

$$1.26 \times fl \geq f_1 \geq 0.85 \times fl \quad (5)$$

$$0.8 \times d_1 \geq d_2 \geq 0.35 \times d_1 \quad (6)$$

$$L \leq 6.25 \text{ mm} \quad (7)$$

$$d_1 \geq 0.225 \times fl \quad (8)$$

$$d_3 \geq 0.225 \times fl \quad (9)$$

wherein L is a distance of the entire length of the lens system [a distance from a surface of the first lens on the side of the object to the image taking surface (a length in air)]; fl is a focal length of the entire lens system; $f_1$ is a focal length of the first lens; $d_1$ is a thickness of the center of the first lens; $d_2$ is a distance between the first and second lenses on an optical axis; and $d_3$ is a thickness of the center of the second lens.

In the imaging lens system, the second lens may be formed as a meniscus lens having a positive power.

In addition, the diaphragm may be disposed to lie at a location displaced toward the first lens from a middle point of a line segment on the optical axis, which connects a surface of the first lens on the side of an image surface and a surface of the second lens on the side of the object to each other.

Further, a brightness of an optical system in the imaging lens system may be defined so that the following expression is established:

$$4.0 > Fno \quad (10)$$

wherein Fno is a brightness of the optical system.

Yet further, an angle of diagonal view in the imaging lens system may be defined so that the following expression is established:

$$2\omega \geq 50° \quad (11)$$

wherein $2\omega$ is an angle of diagonal view.

Yet further, the following conditional expression may be satisfied in the imaging lens system:

$$FL \leq 5.0 \text{ mm} \quad (12)$$

BRIEF DESCRIPTION OF THE DRAWINGS

FIG. 14 is graphs each showing the lateral aberration in the imaging lens system shown in FIG. 12;

FIG. 25 is graphs showing the spherical aberration, the astigmatism and the distortion in the imaging lens system shown in FIG. 24.

DETAILED DESCRIPTION OF THE INVENTION

Figure 1:
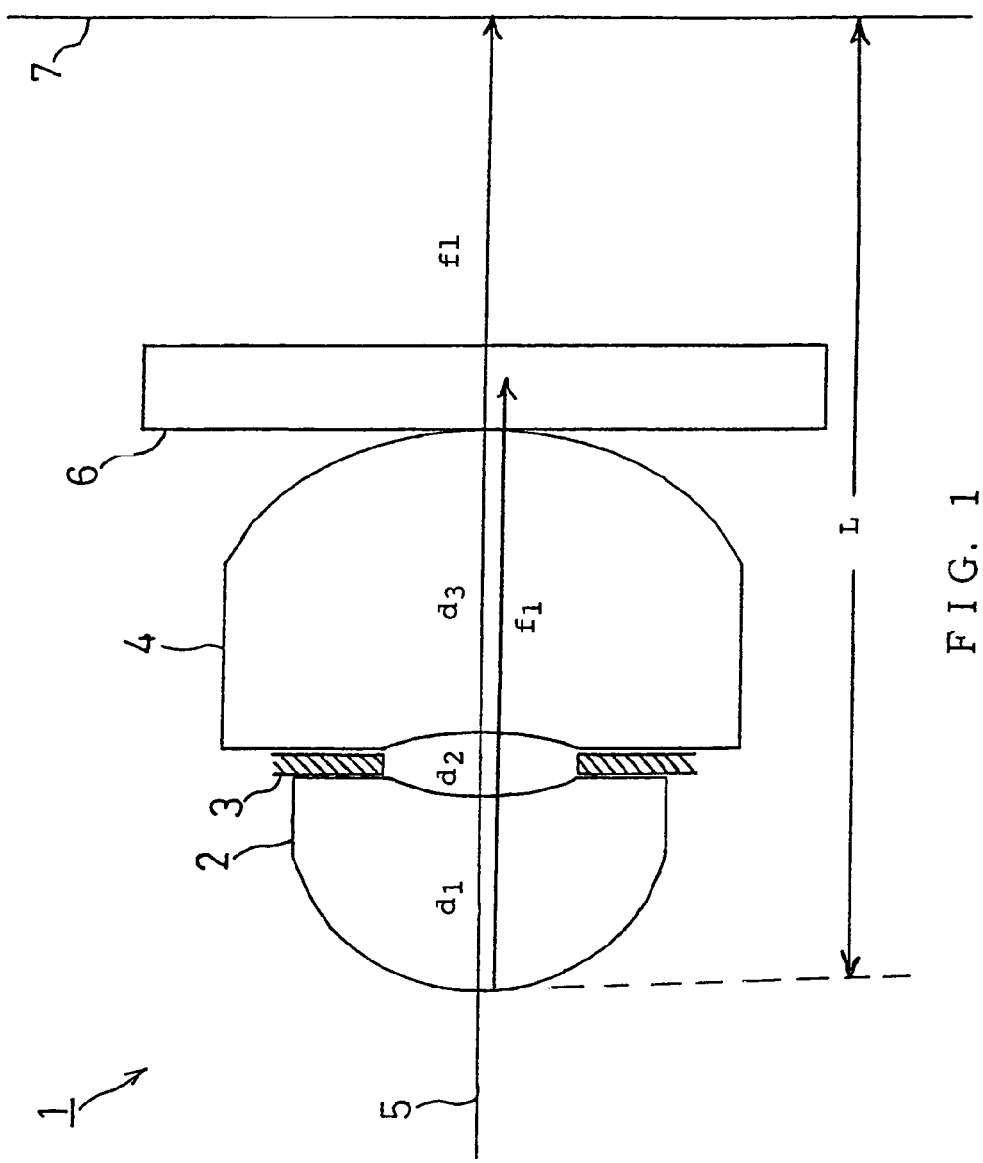
FIG. 1 is a schematic illustration of the arrangement of an embodiment of an imaging lens system according to the present invention.

The present invention will now be described by way of embodiments of imaging lens system with reference to FIGS. 1 to 25.

An imaging lens system 1 according to the present invention includes a first lens 2 which is a meniscus lens with its convex face turned toward an object side and having a positive power as a main power, a diaphragm 3, and a second lens 4 which is a meniscus lens with its concave face turned toward the object side and having a positive power, sequentially in the named order from the side of the object toward an image surface. Herein, lens faces of the first and second lenses 2 and 4 on the sides of the object and the image surface are referred to as a first face and a second face, respectively.

Any of various filters 6 such as a cover glass, a an IR cut filter, a low-pass filter and the like, and an image taking surface 7 which is a light-receiving surface of an image sensor element such as CCD, CMOS and the like are disposed on the side of the second face of the second lens 4. The various filters may be omitted as required.

In the present embodiment, the first lens 2 and the second lens 4 are disposed to satisfy the following conditional expressions (1) and (2):

$$d_2/fl < 0.1 \quad (1)$$

$$-4.0 < \Phi_{air}/\Phi < -2.5 \quad (2)$$

In the expression (1), d2 is a distance on an optical axis 5 between the first lens 2 and the second lens 4, i.e., a distance on the optical axis 5 between the second face of the first lens 2 and the first face of the second lens 4. Further, fl is a focal length of the entire lens system.

In the expression (2), $\Phi_{air}$ is a power of an air lens comprising air existing between the first and second lenses 2 and 4. If a curvature of the second face of the first lens 2 is represented by $c_2$; a curvature of the first face of the second lens 4 is represented by $C_3$; a refraction index of the first lens 2 for refraction of light having a wavelength used in design is represented by $n_1$; and a refraction index of the second lens 4 for refraction of light having a wavelength used in design is represented by $n_3$, a value of $\Phi_{air}$ is represented by the following expression (2—2):

$$\Phi_{air} = c_2(1-n_1) + c_3(n_3-1) + c_2 c_3(n_1-1)(n_3-1)d_2 \quad (2\text{—}2).$$

It should be noted that the light having the wavelength used in design in the present embodiment is light of an e-line (green).

If $d_2/fl$ is equal to or larger than a value (0.1) shown in the expression (1), the entire length of an optical system too large, which is contrary to the demand for reductions in size and weight of the lens system.

If $\Phi_{air}/\Phi$ is equal to or larger than a value (−2.5) shown in the expression (2), a Petzval sum is too large, whereby a distance between a sagittal image surface (S) and a tangential image surface (T) is larger, resulting in a larger astigmatism.

On the other hand, if $\Phi_{air}/\Phi$ is equal to or smaller than a value (−4.0) shown in the expression (2), curvatures of the convex faces of the first and second lenses 2 and 4 are too large and thus, it is difficult to manufacture the first and second lenses 2 and 4. Moreover, an amount of light around each of the lenses is decreased and thus, it is impossible to effectively utilize a light ray incident on the periphery of the solid image sensor element.

Therefore, in the present embodiment, the value of $d_2/fl$ is set to satisfy the conditional expression (1), and the value Of $\Phi_{air}/\Phi$ is set to satisfy the conditional expression (2), whereby the astigmatism can be corrected satisfactorily, and the entire length of the optical system can be reduced, while maintaining a productivity and achieving the effective utilization of the light ray incident on the periphery of the solid image sensor element.

In addition to the above-described arrangement, the following conditional expression may be satisfied:

$$0.4 < (d_1 + d_2 + d_3)/fl < 0.7 \quad (3)$$

In the above expression, $d_1$ is a thickness of the center of the first lens 2, and $d_3$ is a thickness of the center of the second lens 4. In addition, as described above, $d_2$ is a distance between the first and second lenses 2 and 4 on the optical axis 5, and fl is a focal length of the entire lens system.

If $(d_1+d_2+d_3)/fl$ is equal to or larger than a value (0.7) shown in the expression (3), the entire length of the lens system is too large, which is contrary to the demand for the reductions in size and weight of the lens system.

On the other hand, $(d_1+d_2+d_3)/fl$ is equal to or smaller than a value (0.4) shown in the expression (3), the entire lens system is too small, whereby a curvature of each of the lens faces is too large and as a result, it is difficult to produce and assemble the lenses.

Therefore, if the value of $(d_1+d_2+d_3)/fl$ satisfies the expression (3), it is possible to reduce the entire length of the lens system, while maintaining the productivity effectively.

In the present embodiment, the first lens 2 has the main power, as described above, but preferably, the following conditional expression (3-2) is satisfied:

$$\Phi_1/\Phi < 1.2 \quad (3\text{-}2)$$

In the above expression (3-2), $\Phi_1$ is a power of the first lens, and $\Phi$ is a power of the entire lens system, as described above.

If the expression (3-2) is satisfied, it is possible to reduce the size and weight of the lens system, while maintaining an optical performance and the productivity.

Figure 2:
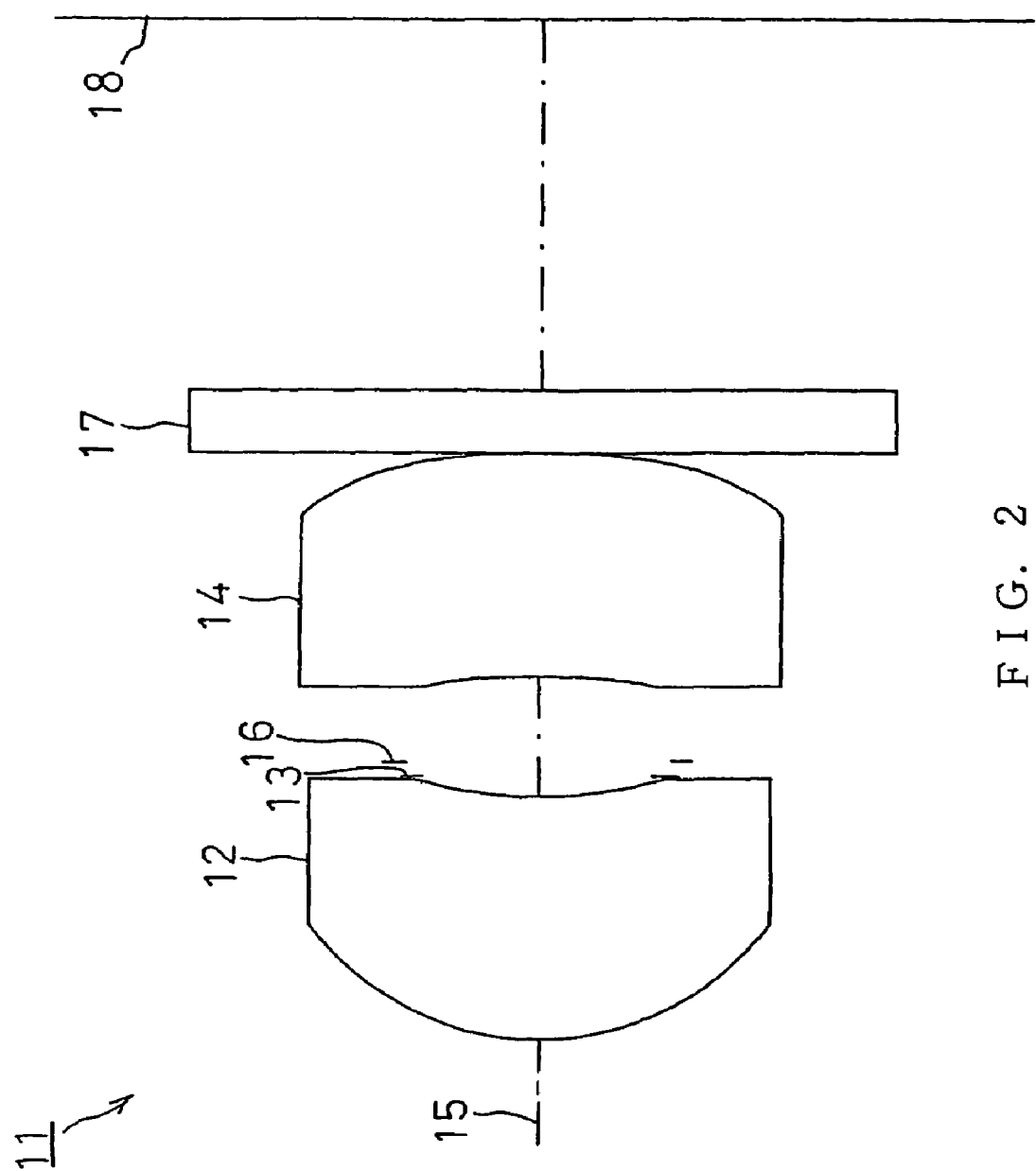
FIG. 2 is a schematic illustration of the arrangement of another embodiment of an imaging lens system according to the present invention different from the imaging lens system shown in FIG. 1.

An imaging lens system 11 in another embodiment of the present invention includes a first lens 12 made of a resin, which is a meniscus lens with its convex face turned toward an object side and having a positive power, a diaphragm 13, and a second lens 14 made of a resin, which is a meniscus lens with its convex face turned toward an image surface side, sequentially in the named order from the side of the object toward the image surface, as shown in FIG. 2. Herein, lens faces of the first and second lenses 12 and 14 on the sides of the object and the image surface are referred to as a first face and a second face, respectively.

A light-amount limiting plate 16 is disposed between the diaphragm 13 and the second lens 14. Any of various filters 17 such as a cover glass, an IR cut filter, a low-pass filter and the like and an image taking surface 18 which is a light-receiving surface of an image sensor element such as CCD, CMOS and the like are disposed on the side of the second face of the second lens 14. The light-amount limiting plate 16 and the various filters 17 may be omitted as required.

In the present embodiment, the first and second lenses 12 and 14 are formed to satisfy the following conditional expressions (4) and (5):

$$1.25 \times fl \geq L \geq 0.8 \times fl \quad (4)$$

$$1.26 \times fl \geq f_1 \geq 0.85 \times fl \quad (5)$$

L in the expression (4) is an entire length of the lens system, i.e., a distance (a length in air) from the first face of the first lens 12 to the image taking surface (the image taking surface 18). In addition, fl in each of the expressions (4) and (5) is a focal length of the entire lens system. Further, $f_1$ in the expression (4) is a focal length of the first lens 12.

If L exceeds a value (1.25×fl) shown in the expression (4), the size of the entire optical system is increased, which is contrary to the demand for reductions in size and weight of the entire lens system. On the other hand, if L is smaller than a value (0.8×fl) shown in the expression (4), it is difficult to maintain an assembling accuracy and the like, resulting in a degradation in productivity, and it is also difficult to maintain desired optical characteristics. Further, it is difficult to ensure a back focal length for inserting the various filters between the second lens 14 and the image taking surface 18.

It is more preferable that the relationship between L and fl is set to be in a range of $1.25 \times fl \geq L \geq 1.0 \times fl$.

If $f_1$ exceeds a value (1.26×fl) shown in the expression (5), the back focal length is too large and as a result, it is difficult to reduce the size and the weight of the lens system. On the other hand, if $f_1$ is smaller than a value (0.85×fl) shown in the expression (5), it is difficult to ensure a back focal length of a certain value sufficient to insert the various filters 17 between the second lens 14 and the image taking surface 18. Moreover, the telecentric property is degraded, causing the shading. It is also difficult to form, particularly, the first face of the first lens 12s with a good accuracy, resulting in a degradation in productivity.

It is more preferably that the relationship between $f_1$ and fl is set to be in a range of $1.0 \times fl \geq f_1 \geq 0.9 \times fl$.

Therefore, according to the present embodiment, it is possible to reduce the size and the weight of the entire optical system, while maintaining the productivity, by setting the value of L to satisfy the conditional expression (4) and setting the value of $f_1$ to satisfy the conditional expression (5). It is also possible to effectively utilize a light ray incident on an end of the image taking surface 18 (sensor) by maintaining the distance between a projected pupil and the image taking surface 18 to enhance the telecentric property. Further, it is possible to effectively correct the coma and the distortion to enhance the optical performance.

In addition to the above-described arrangement, the present embodiment is arranged so that the following conditional expression (6) is satisfied:

$$0.8 \times d_1 \geq d_2 \geq 0.35 \times d_1 \quad (6)$$

In the expression (6), $d_1$ is a thickness of the center of the first lens 12, and $d_2$ is a distance between the second face of the first lens 12 and the first face of the second lens 14.

If $d_2$ exceeds a value (0.8×$d_1$) shown in the expression (6), powers of the first and second lenses 12 and 14 must be increased and as a result, it is difficult to produce the lenses 12 and 14. In addition, the level of a light ray passing through the second face of the second lens 14 from the optical axis 15 is higher, and an aspherical power is increased and hence, it is further difficult to produce the second lens 14. On the other hand, if d2 is smaller than a value (0.35×$d_1$) shown in the expression (6), it is difficult to insert the diaphragm 13 for effectively limiting the amount of light between the first and second lenses 12 and 14 and moreover, the value of $d_1$ is increased relatively and thus, it is difficult to ensure a sufficient back focal length.

Therefore, if the conditional expression (6) is satisfied, it is possible to ensure a further good productivity and to maintain a high optical performance.

It is desirable that the relationship between $d_2$ and $d_1$ is more preferably set to be in a range of $0.5 \times d_1 \geq d_2 \geq 0.35 \times d_1$.

Further, the present embodiment is arranged so that the value of L which is the entire length of the above-described lens system satisfies the following conditional expression (7):

$$L \leq 6.25 \text{ mm} \tag{7}$$

If L exceeds a value shown in the expression (7), the entire length of the lens system is too large, and the entire length of the entire optical system is increased, which is an obstruct to a reduction in size of an image taking device to which the imaging lens system according to the present invention is applied.

Therefore, in the present embodiment, it is possible to realize a further reduction in size of the entire optical system by ensuring that the value of L satisfies the expression (7).

The second lens 14 may be formed as a meniscus lens having a positive power.

In this case, a telecentric property can be ensured further effectively.

In addition to the above-described arrangement, the diaphragm 13 may be disposed to lie at a point displaced toward the first lens 12 from a middle point of a line segment on the optical axis 15, which connects the second face of the first lens 12 and the first face of the second lens 14 to each other. In this case, the diaphragm 13 may be disposed at a location where it is in contact with the second face of the first lens 12.

If the diaphragm 13 is disposed as described above, it is possible to more reliably maintain a distance between a projected pupil and the image taking surface 18 (sensor) and to ensure a telecentric property without application of a load to the shape of each of the lenses 12 and 14 and the like. It is also possible to effectively utilize an amount of light incident on the image taking surface 18.

In the present embodiment, the thickness $d_1$ of the center of the first lens 12 is defined to satisfy the following expression (8), and the thickness $d_3$ of the center of the second lens 14 is defined to satisfy the following expression (9):

$$d_1 \geq 0.225 \times fl \tag{8}$$

$$d_3 \geq 0.225 \times fl \tag{9}$$

If the thicknesses of the centers of the first and second lenses 12 and 14 are defined as described above, the productivity can be ensured appropriately for even an imaging pickup lens system according to the present invention, which is adapted to be mounted in a small-sized image taking device, by ensuring that each of the lenses has a given thickness.

Further, in the present embodiment, a brightness of the optical system is defined as represented by the following expression (10):

$$4.0 > Fno \tag{10}$$

In the expression (10), Fno is a brightness of the optical system.

In a case where the sensitiveness of a solid image sensor element is taken into consideration and it is taken into consideration that a camera mounted in a mobile telephone or PDA using the imaging lens system 11 according to the present embodiment is used under a situation where an amount of light is smaller, such as in the night and in a dark place, if the brightness of the optical system exceeds a value (4.0) shown in the expression (10), an image on the image taking surface is too dark even if a stroboscopic function is used. Thus, there is a possibility that a noise or the like is generated, and an image picture is deteriorated.

Therefore, in the present embodiment, it is possible to take a further bright and good image picture under a situation where an amount of light is smaller, by setting the value of Fno to satisfy the expression (10). To take a good image picture having little noise without use of a stroboscope, it is preferable that the brightness Fno of the optical system is set as represented by the following expression:

$$2.8 \geq Fno \tag{10-2}$$

In the present embodiment, an angle of diagonal view (an angle of full view) is defined as represented by the following expression:

$$2\omega \geq 50° \tag{11}$$

In the expression (11), $2\omega$ is an angle of diagonal view.

The imaging lens system 11 according to the present embodiment is used in a camera mounted in a mobile telephone, PDA or the like, as described above. Such a type of a camera is required to shoot a landscape in a wide range or a large number of persons, but if the angle of diagonal view is smaller than a value (50°) shown in the expression (11), such requirement cannot be satisfied.

Therefore, in the present embodiment, it is possible to sufficiently satisfy a specification required for the camera mounted in the mobile telephone, PDA or the like by setting the value of the angle of diagonal view to satisfy the expression (11).

Further, the present embodiment is arranged so that fl which is the value of the focal length of the lens system satisfies the following conditional expression (12):

$$fl \leq 5.0 \text{ mm} \tag{12}$$

Thus, it is possible to form the imaging lens system in an appropriate arrangement in order to realize a reduction in size and an increase in angle of view.

Because each of the first and second lenses 12 and 14 is formed of a resin material, as described above, the weight of each of the lenses can be reduced as compared with a glass material, and the lenses 12 and 14 can be formed easily by the molding of a resin, leading to an enhancement in producing efficiency. In addition, it is possible to reduce the manufacture cost by using an inexpensive material.

A resin material having any composition may be used for forming each of the first and second lenses 12 and 14, if it has a transparency and is used for the formation of an optical part, such as an acryl resin, a polycarbonate resin and an amorphous polyolefin resin. However, from the viewpoints of a further enhancement in producing efficiency and a further reduction in producing cost, it is desirable that the same resin material is used for the lenses 12 and 14.

Examples of the present invention will now be described with reference to FIGS. 3 to 25.

In first to fifth examples which will be described hereinafter, Fno represents an F-number; $2\omega$ represents an angle of full view; c represents a curvature of an optical surface; d represents a distance to a next optical surface; ne represents a refraction index of each optical system when an e-line (green) was applied; and vd represents an Abbe number of each optical system when a d-line (yellow) was applied.

Each of k, A and B represents a factor in an equation (13) which will be shown below. Namely, if a Z axis is taken in a direction of extension of an optical axis 5, and an X-axis is taken in a direction perpendicular to the optical axis 5; a direction of travel of light is defined to be positive; k represents a conical factor; each of A and B represents an aspherical factor; and c represents a curvature, the aspherical shape of each lens is represented by the following equation:

$$Z(X)=cX^2/[1+\{1-(k+1)c^2X^2\}^{1/2}]+AX^4+BX^6 \quad (13)$$

In sixth to ninth examples which will be described hereinafter, fl represents a focal length of the entire lens system; L represents the entire length of the lens system, i.e., a distance (a length in air) from a first face of a first lens 12 to an image taking surface 18; $f_1$ represents a focal length of the first lens 12; Fno represents an F number; 2ω represents an angle of diagonal view (an angle of full view); and r represents a radius of curvature of an optical surface (in a case of a lens, a radius of curvature of the lens at its center). In addition, nd represents a refraction index of each optical system when a d-line (yellow) was applied, and vd represents an Abbe number of each optical system when a d-line was likewise applied.

Each of k, A, B, C and D represents a factor in an equation (14) which will be shown below. Namely, if a Z-axis is taken in a direction of extension of an optical axis 5, and an X-axis is taken in a direction perpendicular to the optical axis 5; a direction of travel of light is defined to be positive; k represents a conical factor; each of A, B, C and D represents an aspherical factor; and r represents a radius of curvature, the aspherical shape of each lens is represented by the following equation:

$$Z(X)=r^{-1}X^2/[1+\{1-(k+1)r^{-2}X^2\}^{1/2}]+AX^4+BX^6+CX^8+DX^{10} \quad (14)$$

FIRST EXAMPLE

Figure 3:
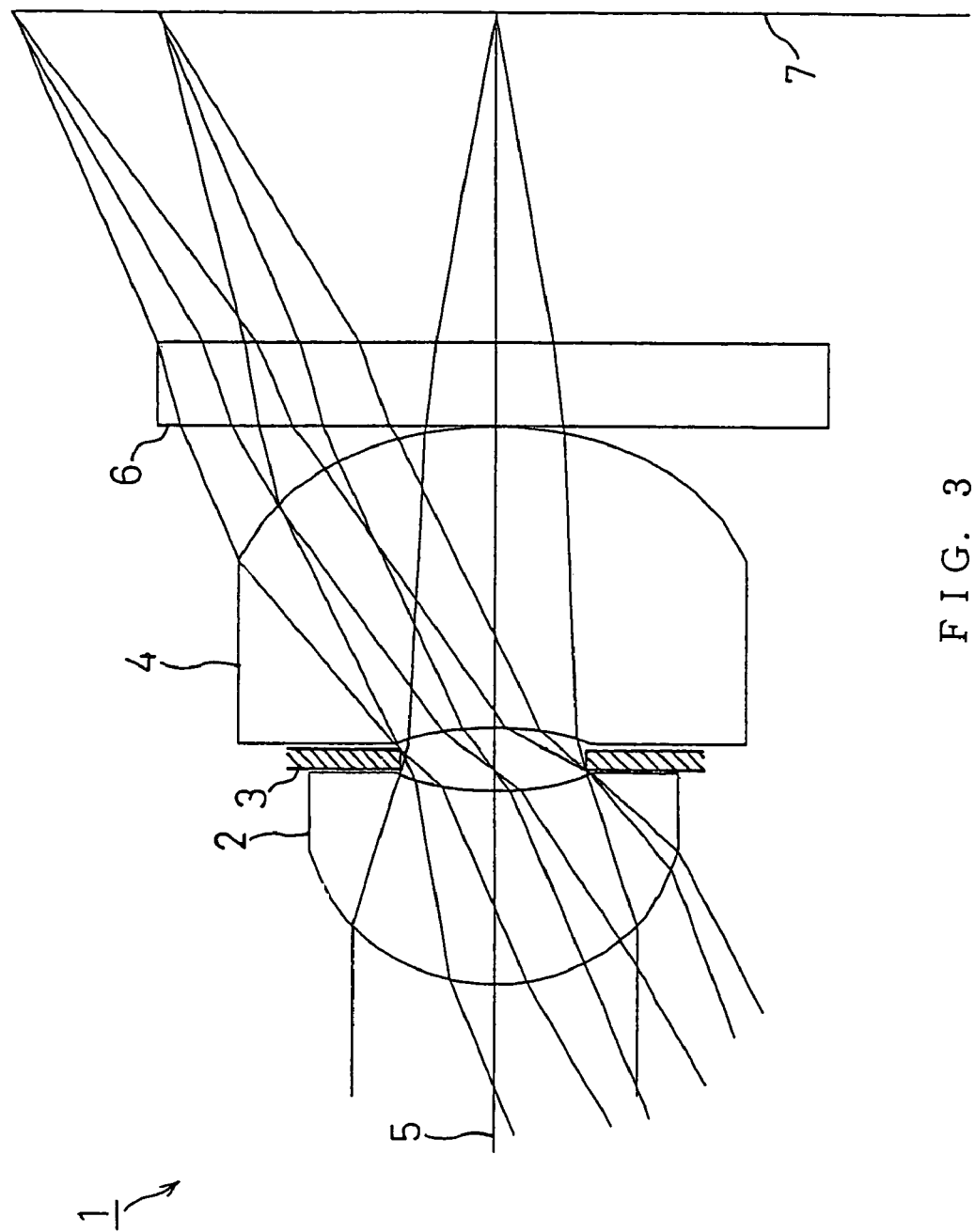
FIG. 3 is a schematic illustration showing the arrangement of a first example of the imaging lens system according to the present invention.

FIG. 3 shows the first embodiment of the present invention. In this example, a diaphragm 3 is disposed between a first lens 2 and a second lens 3, and a cover glass 6 as one example of a filter is disposed at a location on the side of an image surface the second lens, as in the imaging lens system 1 having the arrangement shown in FIG. 1.

The imaging lens system in the first example is set under the following conditions:
fl=3.80 mm; Fno=2.85; 2ω=62.6°; $d_1$=0.9 mm; $d_2$=0.3 mm; $d_3$=1.45 mm; $\Phi_{air}$=−0.688671 mm$^{-1}$; $\Phi$=0.263158 mm$^{-1}$

| Face number | c | d | ne | vd |
|---|---|---|---|---|
| (Object point) | | ∞ | | |
| 1 (First face of first lens) | 1.03156 | 0.90 | 1.52692 | 56.2 |
| 2 (second face of first lens) | 0.708265 | 0.10 | | |
| 3 (Diaphragm) | 0 | 0.20 | | |
| 4 (first face of second lens) | −0.538423 | 1.45 | 1.52692 | 56.2 |
| 5 (second face of second lens) | −0.562493 | 0.0 | | |
| 6 (first face of cover glass) | 0 | 0.40 | 1.51825 | 64.2 |
| 7 (second face of cover glass) (Image surface) | 0 | 1.549 | | |

| Face number | K | A | B |
|---|---|---|---|
| 1 | 0.1804668 | −1.059282E−2 | −4.365457E−3 |
| 2 | 3.807702 | −1.061820E−2 | −1.010247E−2 |
| 4 | 0.5767871 | −1.556526E−1 | −1.145704 |
| 5 | 0.9825455 | 4.537203E−3 | −1.584557E−2 |

Under such conditions, $d_2$/fl=0.079, which satisfied the expression (1). In addition, $\Phi_{air}/\Phi$=−2.617, which satisfied the expression (2). Further, $(d_1+d_2+d_3)$/fl=0.697, which satisfied the expression (3).

Figure 4:
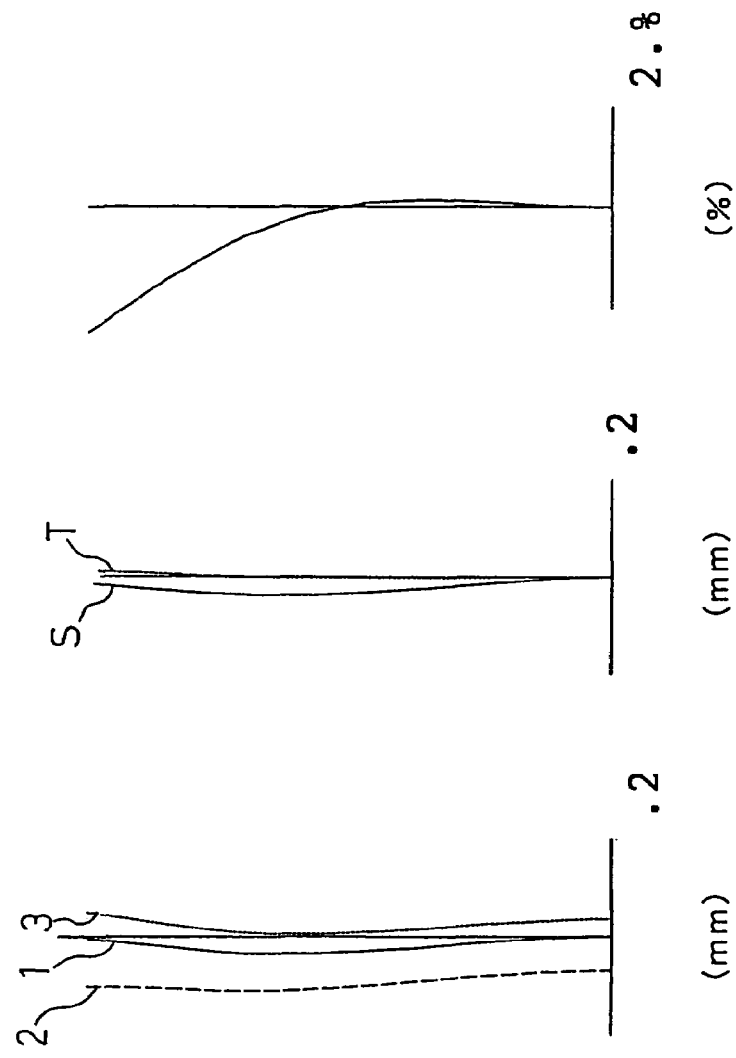
FIG. 4 is graphs showing the spherical aberration, the astigmatism and the distortion in the imaging lens system shown in FIG. 3.
Figure 5:
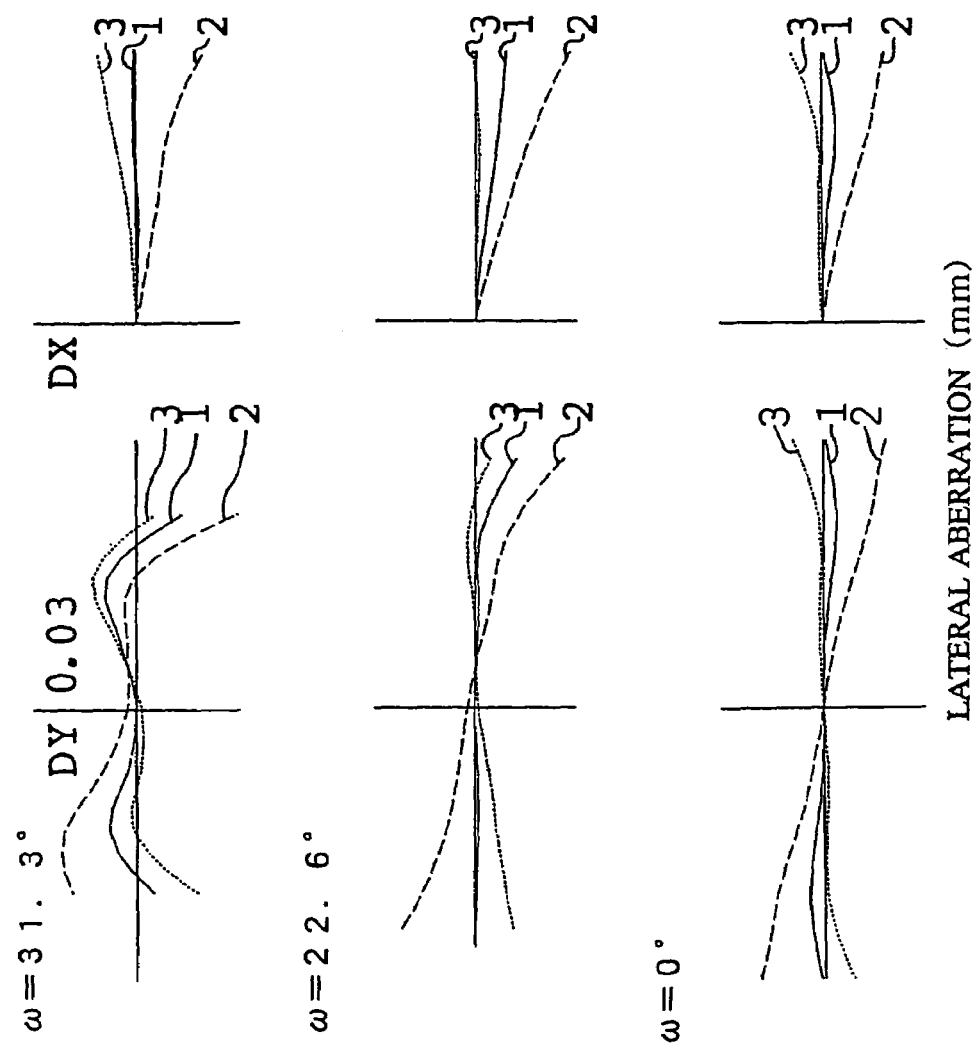
FIG. 5 is graphs each showing the lateral aberration in the imaging lens system shown in FIG. 3.

The spherical aberration, the astigmatism and the distortion in the imaging lens system 1 in the first example are shown in FIG. 4, and the lateral aberration is shown in FIG. 5.

As a result, it can be seen that any of the spherical aberration, the astigmatism, the distortion and the lateral aberration can be satisfied and hence, sufficient optical characteristics can be provided.

SECOND EXAMPLE

Figure 6:
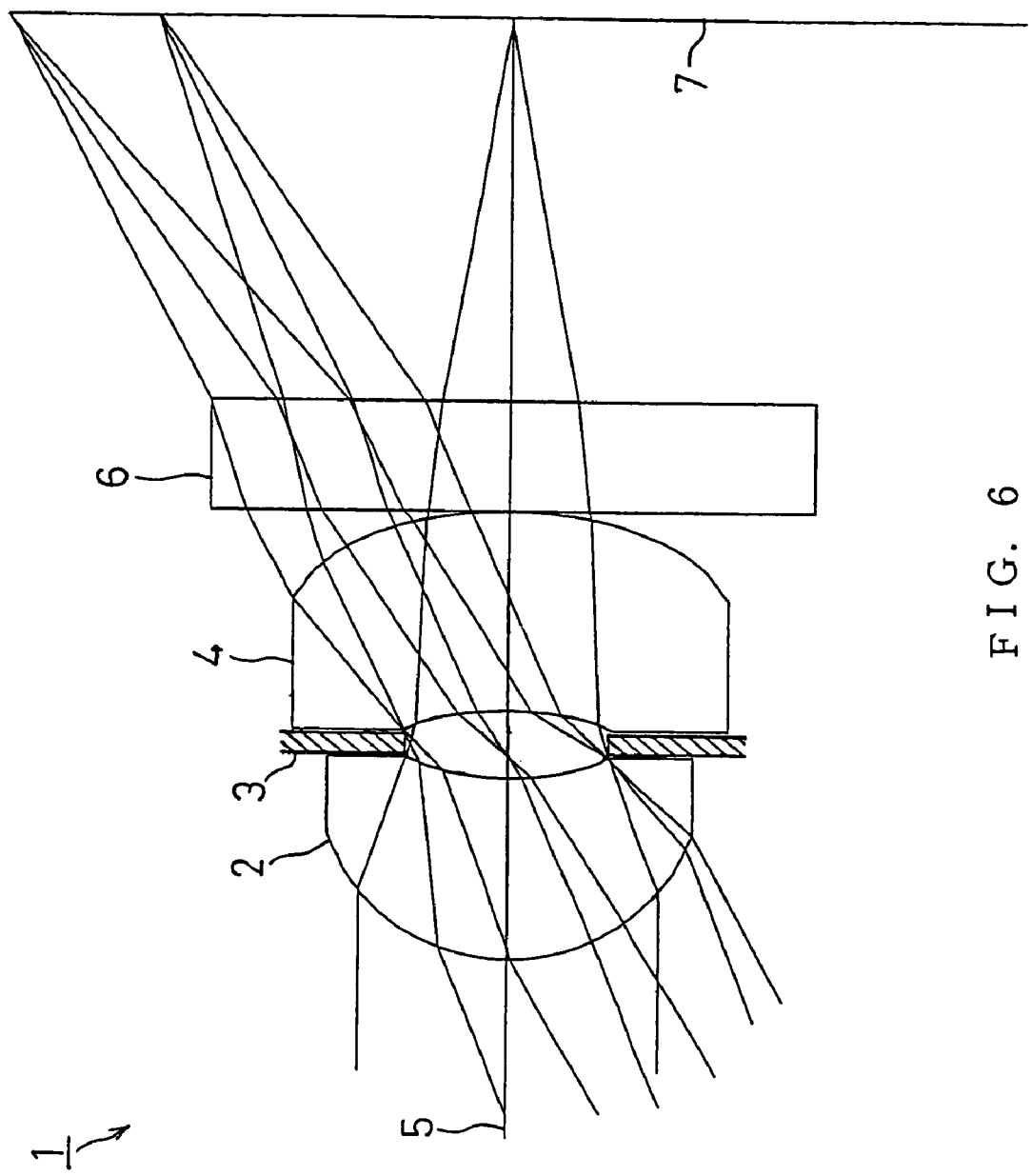
FIG. 6 is a schematic illustration showing the arrangement of a second example of the imaging lens system according to the present invention.

FIG. 6 shows a second example of the present invention. An imaging lens system 1 in the second example is set under the following conditions:
fl=3.80 mm; Fno=2.85; 2ω=61.2°; $d_1$=0.8 mm; $d_2$=0.3 mm; $d_3$=0.9 mm; $\Phi_{air}$=−0.746161 mm$^{-1}$; $\Phi$=0.263158 mm$^{-1}$

| Face number | c | d | ne | vd |
|---|---|---|---|---|
| (Object point) | | ∞ | | |
| 1 (First face of first lens) | 1.112098 | 0.80 | 1.52692 | 56.2 |
| 2 (second face of first lens) | 0.800174 | 0.10 | | |
| 3 (Diaphragm) | 0 | 0.20 | | |
| 4 (first face of second lens) | −0.546746 | 0.90 | 1.52692 | 56.2 |
| 5 (second face of second lens) | −0.509997 | 0.0 | | |
| 6 (first face of cover glass) | 0 | 0.50 | 1.51825 | 64.2 |
| 7 (second face of cover glass) (Image surface) | 0 | 1.701 | | |

| Face number | K | A | B |
|---|---|---|---|
| 1 | 0.1598616 | −1.126125E−2 | −7.251079E−3 |
| 2 | −0.9159409 | 2.345736E−1 | 3.975805E−1 |
| 4 | 11.44252 | −8.951630E−2 | −2.279703E−1 |
| 5 | 2.784102 | −1.026661E−3 | −4.081407E−2 |

Under such conditions, $d_2$/fl=0.079, which satisfied the expression (1). In addition, $\Phi_{air}/\Phi$=−2.835, which satisfied the expression (2). Further, $(d_1+d_2+d_3)$/fl=0.526, which satisfied the expression (3).

Figure 7:
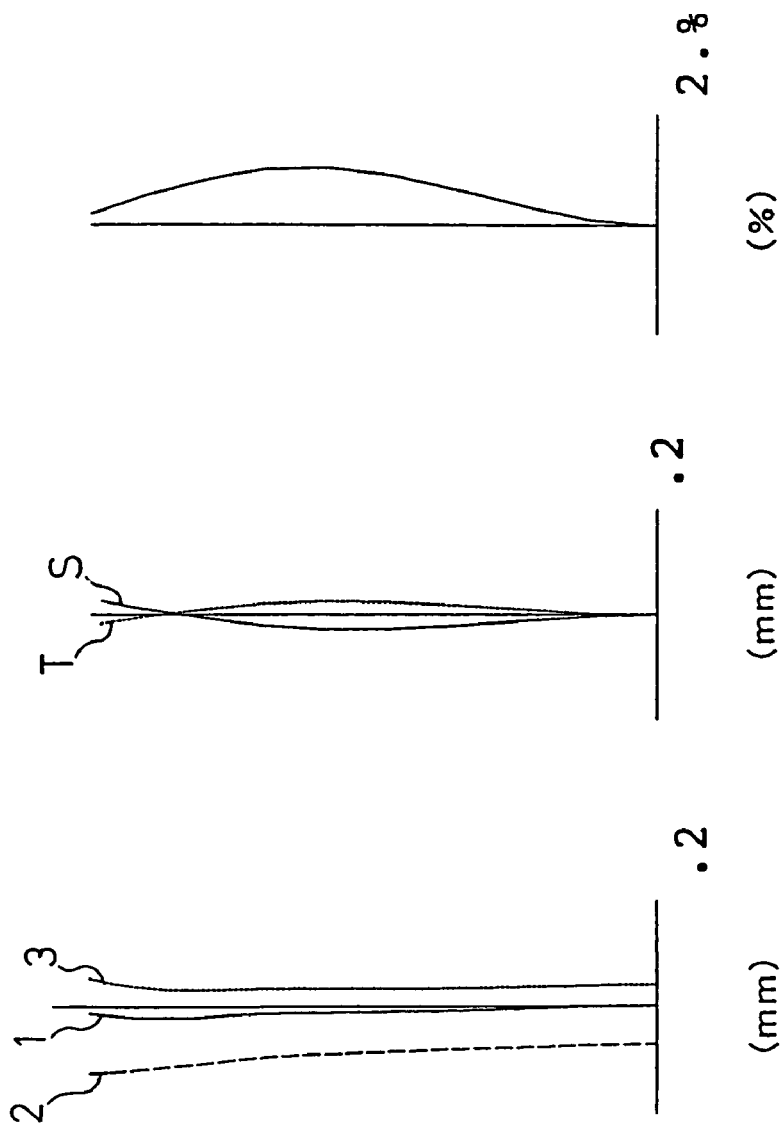
FIG. 7 is graphs showing the spherical aberration, the astigmatism and the distortion in the imaging lens system shown in FIG. 6.
Figure 8:
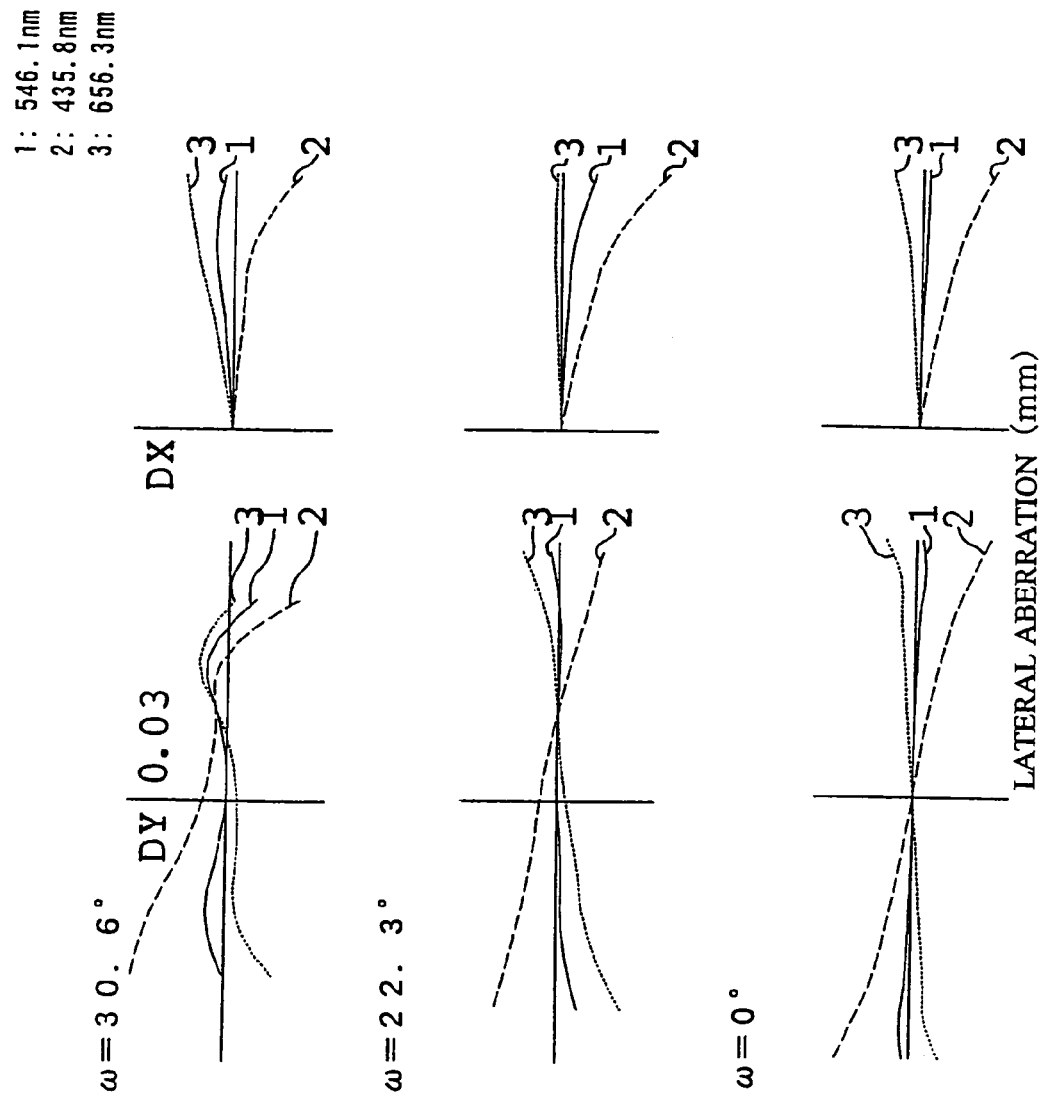
FIG. 8 is graphs each showing the lateral aberration in the imaging lens system shown in FIG. 6.

The spherical aberration, the astigmatism and the distortion in the imaging lens system 1 in the second example are shown in FIG. 7, and the lateral aberration is shown in FIG. 8.

As a result, it can be seen that any of the spherical aberration, the astigmatism, the distortion and the lateral aberration can be satisfied and hence, sufficient optical characteristics can be provided.

THIRD EXAMPLE

Figure 9:
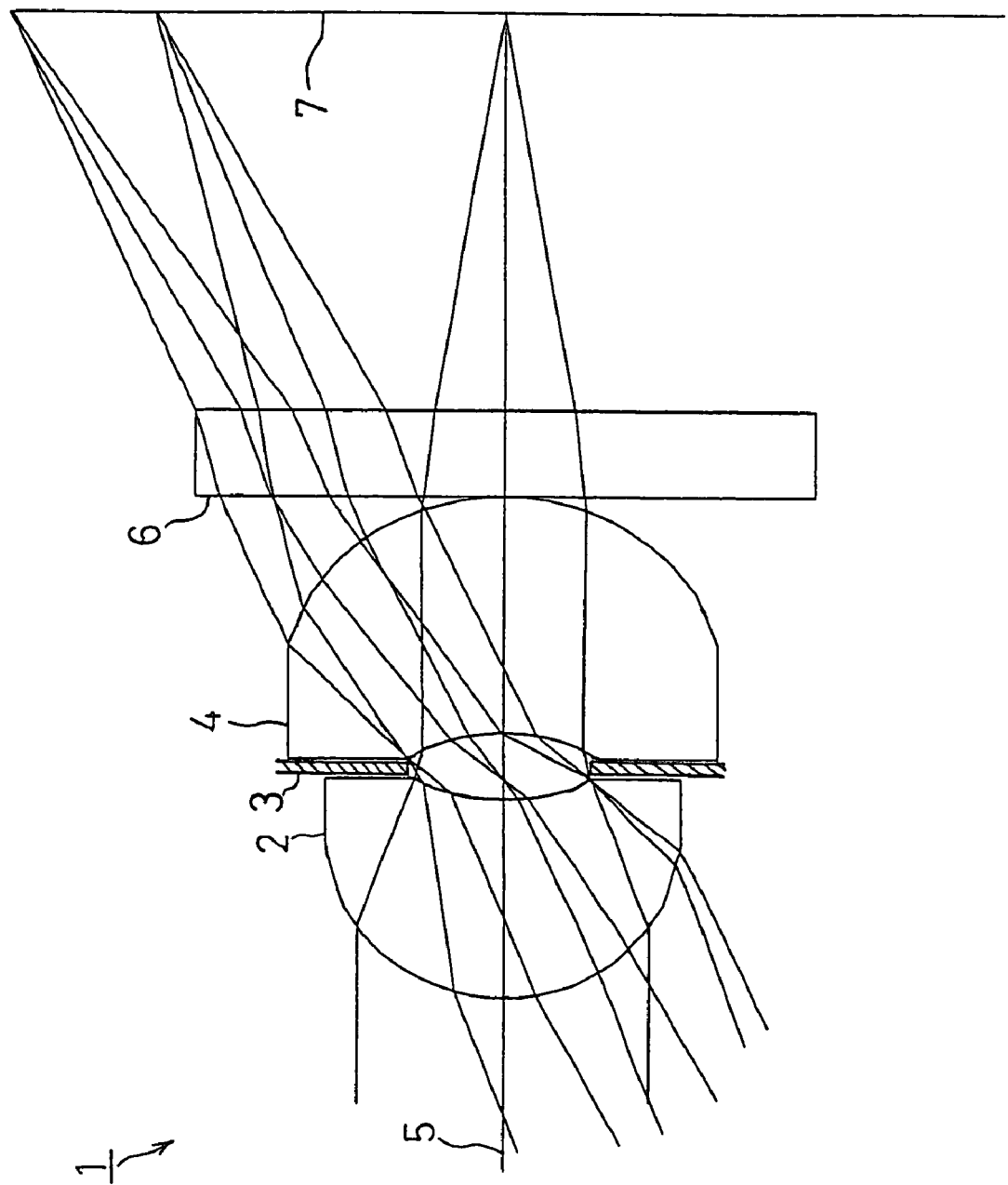
FIG. 9 is a schematic illustration showing the arrangement of a third example of the imaging lens system according to the present invention.

FIG. 9 shows a third example of the present invention. An imaging lens system 1 in the third example is set under the following conditions:
fl=3.80 mm; Fno=2.85; 2ω=59.7°; $d_1$=0.9 mm; $d_2$=0.3 mm; $d_3$=1.1 mm; $\Phi_{air}$=−1.050566 mm$^{-1}$; $\Phi$=0.263158 mm$^{-1}$

| Face number | c | d | ne | vd |
|---|---|---|---|---|
| (Object point) | | ∞ | | |
| 1 (First face of first lens) | 1.143721 | 0.90 | 1.52692 | 56.2 |
| 2 (second face of first lens) | 0.902881 | 0.09 | | |
| 3 (Diaphragm) | 0 | 0.21 | | |

-continued

| Face number | c | d | ne | vd |
|---|---|---|---|---|
| 4 (first face of second lens) | −0.954649 | 1.10 | 1.52692 | 56.2 |
| 5 (second face of second lens) | −0.860982 | 0.0 | | |
| 6 (first face of cover glass) | 0 | 0.40 | 1.51825 | 64.2 |
| 7 (second face of cover glass) (Image surface) | 0 | 1.805 | | |

| Face number | K | A | B |
|---|---|---|---|
| 1 | 0.153769 | −5.188658E−2 | −9.123322E−3 |
| 2 | 3.987563 | 1.629469E−2 | −2.269491E−1 |
| 4 | 0 | −2.189219E−1 | −2.241663 |
| 5 | 0.3749068 | 1.780739E−3 | −1.419786E−2 |

Under such conditions, $d_2/fl=0.079$, which satisfied the expression (1). In addition, $\Phi_{air}/\Phi=-3.992$, which satisfied the expression (2). Further, $(d_1+d_2+d_3)/fl=0.605$, which satisfied the expression (3).

Figure 10:
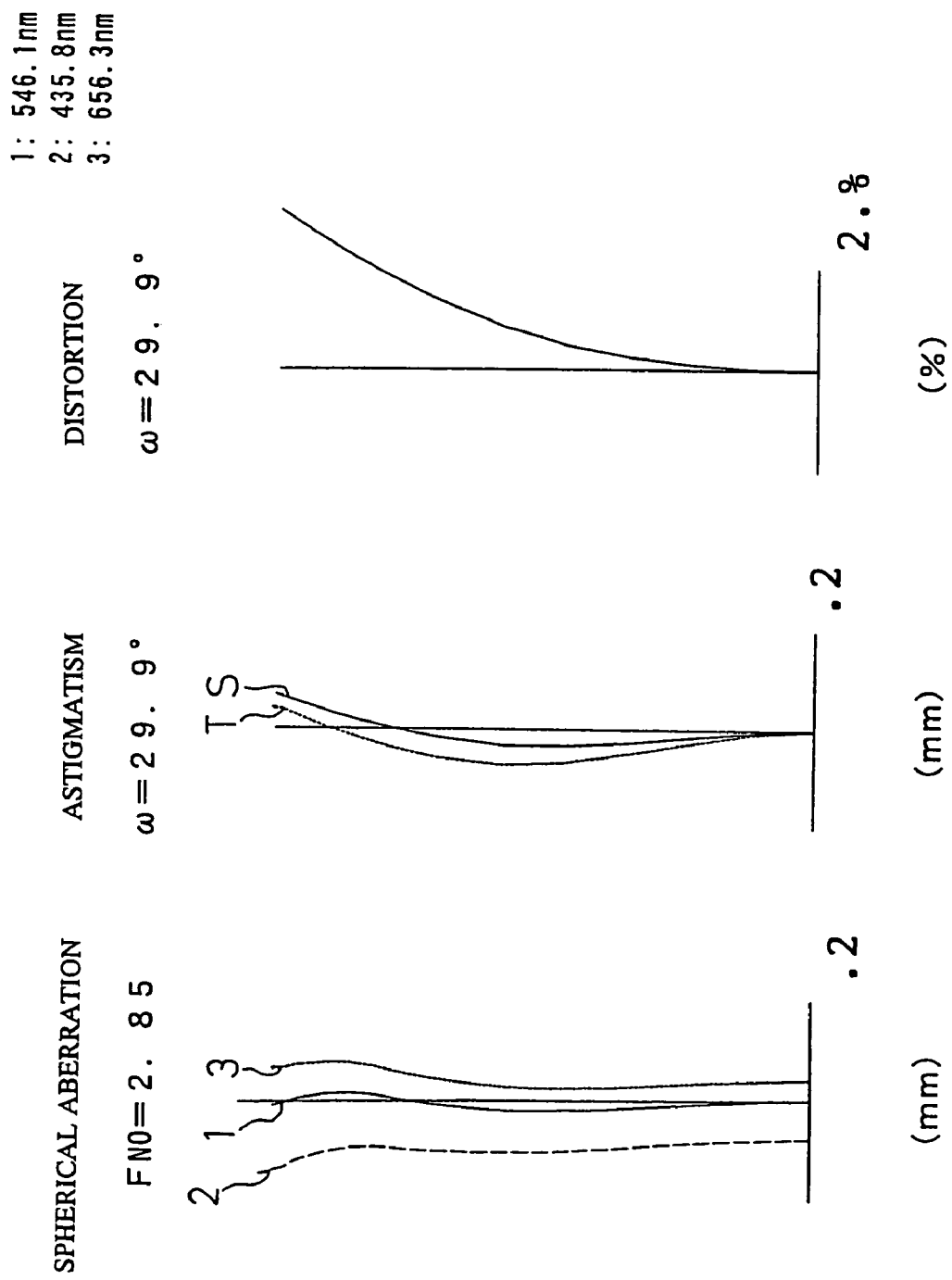
FIG. 10 is graphs showing the spherical aberration, the astigmatism and the distortion in the imaging lens system shown in FIG. 9.
Figure 11:
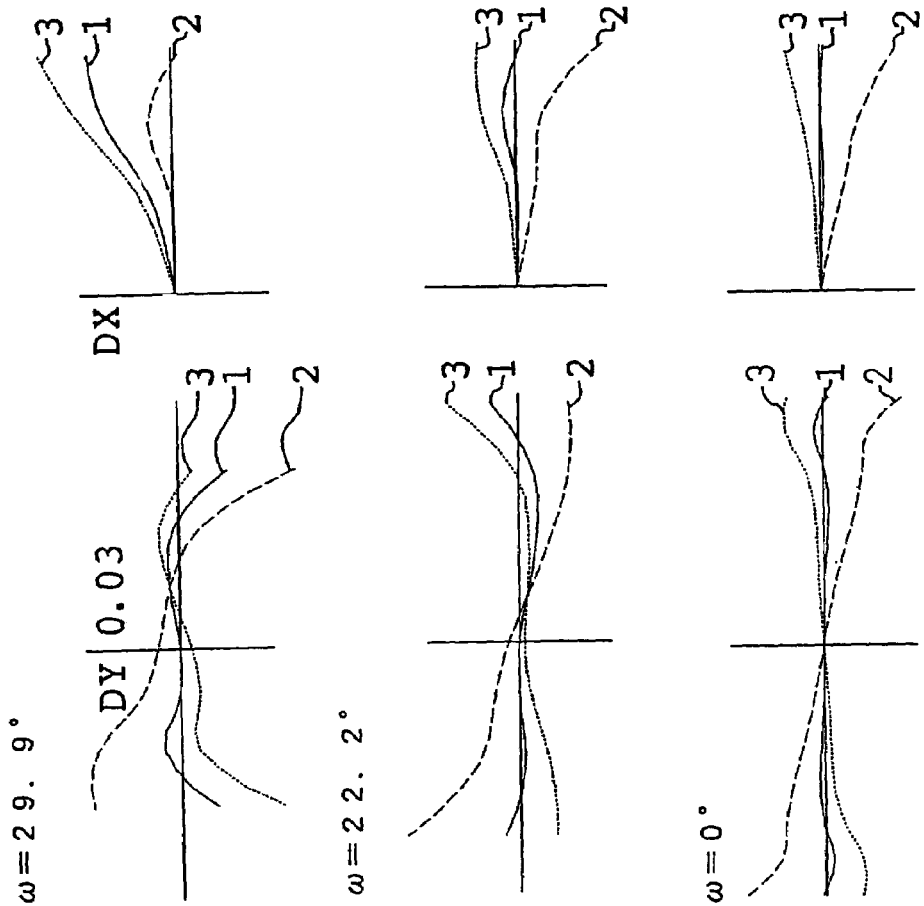
FIG. 11 is graphs each showing the lateral aberration in the imaging lens system shown in FIG. 9.

The spherical aberration, the astigmatism and the distortion in the imaging lens system 1 in the third example are shown in FIG. 10, and the lateral aberration is shown in FIG. 11.

As a result, it can be seen that any of the spherical aberration, the astigmatism, the distortion and the lateral aberration can be satisfied and hence, sufficient optical characteristics can be provided.

FOURTH EXAMPLE

Figure 12:
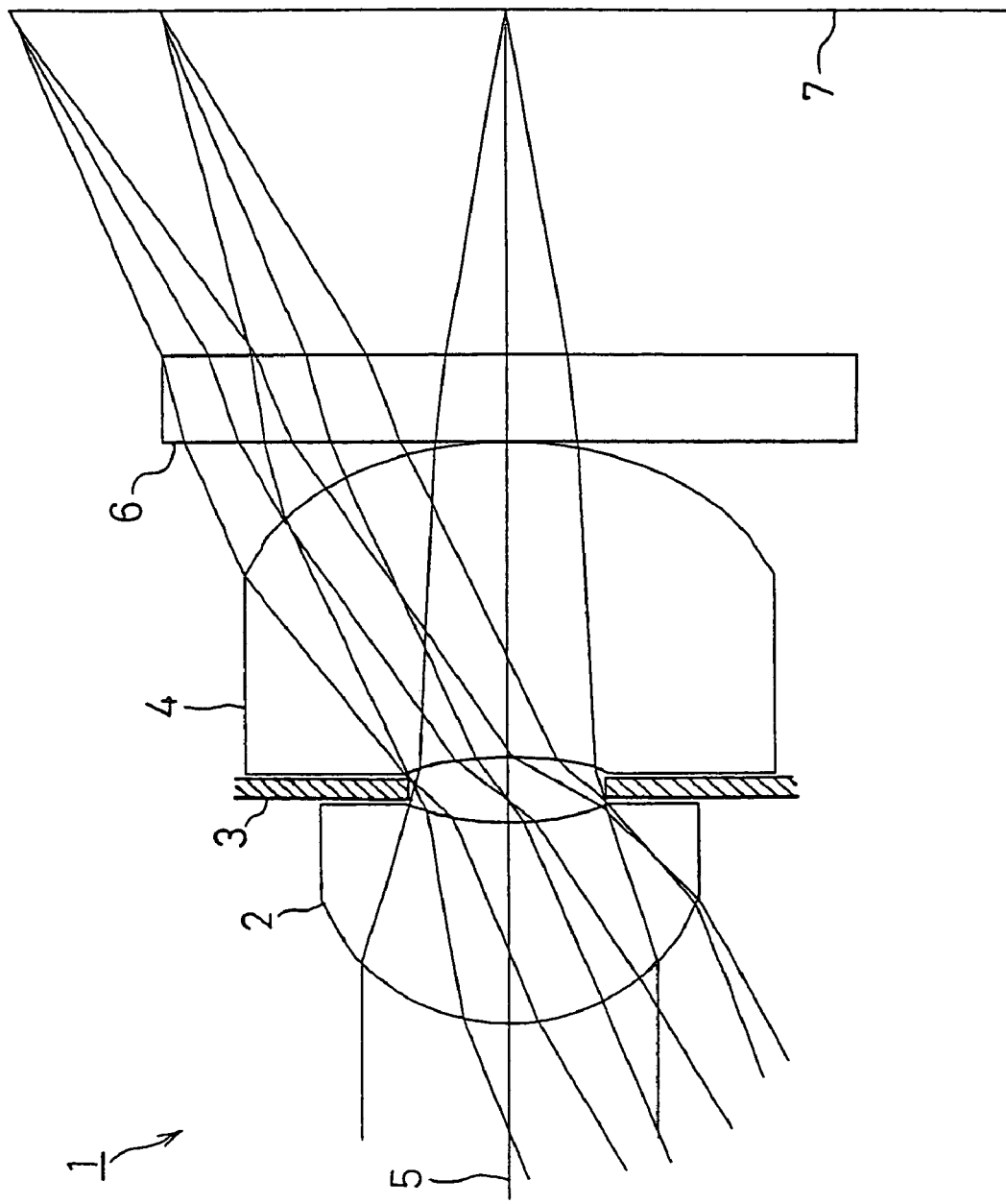
FIG. 12 is a schematic illustration showing the arrangement of a fourth example of the imaging lens system according to the present invention.

FIG. 12 shows a fourth example of the present invention. An imaging lens system 1 in the fourth example is set under the following conditions:

fl=3.80 mm; Fno=2.85; 2ω=62.1°; $d_1$=0.9 mm; $d_2$=0.3 mm; $d_3$=1.45 mm; $\Phi_{air}$=−0.680382 mm$^{-1}$; $\Phi$=0.263158 mm$^{-1}$

| Face number | c | d | ne | vd |
|---|---|---|---|---|
| (Object point) | | ∞ | | |
| 1 (First face of first lens) | 1.026539 | 0.90 | 1.52692 | 56.2 |
| 2 (second face of first lens) | 0.698027 | 0.10 | | |
| 3 (Diaphragm) | 0 | 0.20 | | |
| 4 (first face of second lens) | −0.534262 | 1.45 | 1.52692 | 56.2 |
| 5 (second face of second lens) | −0.556969 | 0.0 | | |
| 6 (first face of cover glass) | 0 | 0.40 | 1.51825 | 64.2 |
| 7 (second face of cover glass) (Image surface) | 0 | 1.550 | | |

| Face number | K | A | B |
|---|---|---|---|
| 1 | 0.1896112 | −1.116567E−2 | −5.939006E−3 |
| 2 | 3.962633 | −3.498629E−2 | 1.206361E−1 |
| 4 | 1.686719 | −1.512277E−1 | −9.503996E−1 |
| 5 | 0.9752553 | 5.958662E−3 | −1.461578E−2 |

Under such conditions, $d_2/fl=0.079$, which satisfied the expression (1) In addition, $\Phi_{air}/\Phi=-2.585$, which satisfied the expression (2). Further, $(d_1+d_2+d_3)/fl=0.697$, which satisfied the expression (3).

Figure 13:
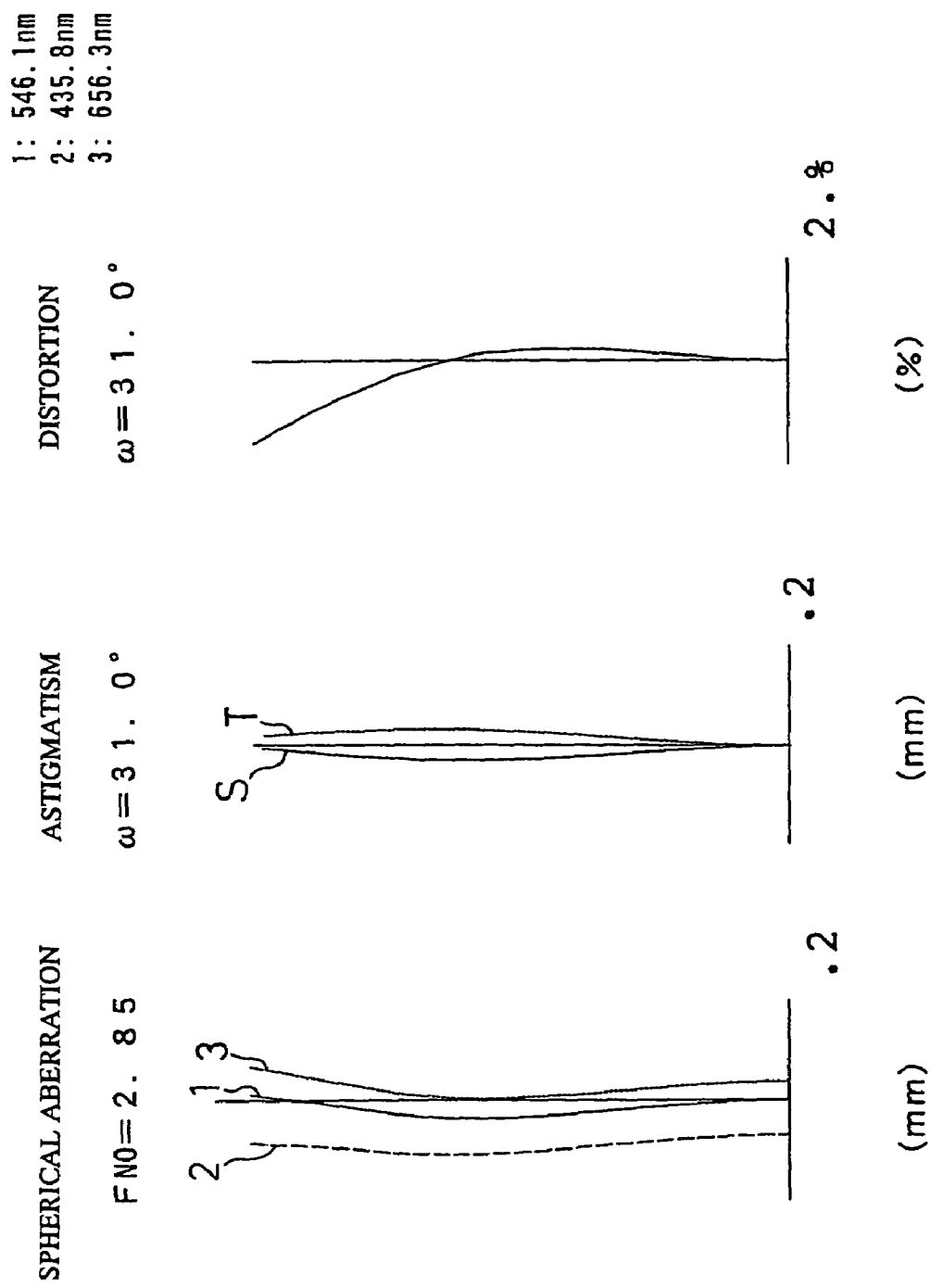
FIG. 13 is graphs showing the spherical aberration, the astigmatism and the distortion in the imaging lens system shown in FIG. 12.

The spherical aberration, the astigmatism and the distortion in the imaging lens system 1 in the fourth example are shown in FIG. 13, and the lateral aberration is shown in FIG. 14.

As a result, it can be seen that any of the spherical aberration, the astigmatism, the distortion and the lateral aberration can be satisfied and hence, sufficient optical characteristics can be provided.

FIFTH EXAMPLE

Figure 15:
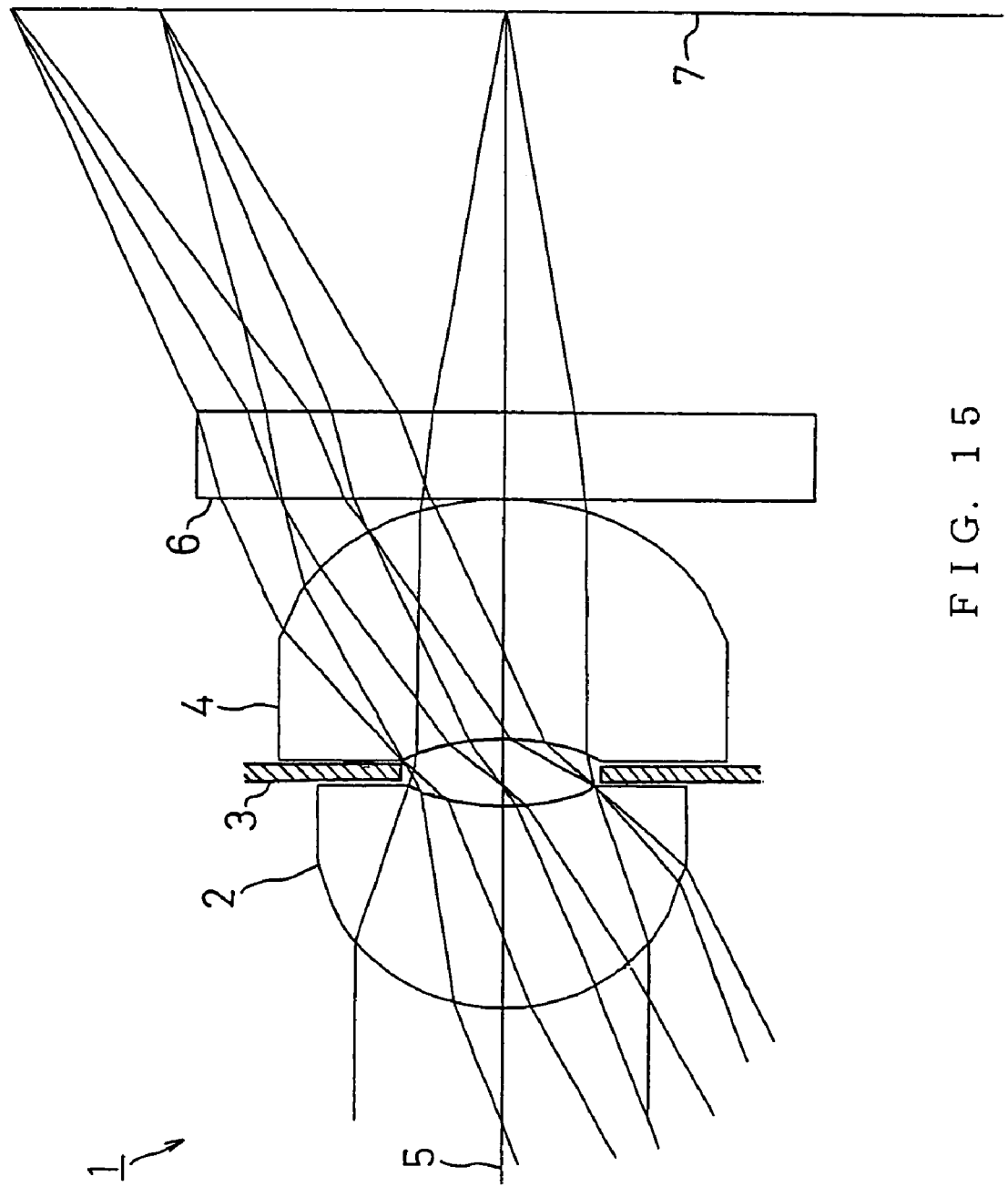
FIG. 15 is a schematic illustration showing the arrangement of a fifth example of the imaging lens system according to the present invention.

FIG. 15 shows a fifth example of the present invention. An imaging lens system 1 in the fifth example is set under the following conditions:

fl=3.80 mm; Fno=2.85; 2ω=60.8°; $d_1$=0.9 mm; $d_2$=0.3 mm; $d_3$=1.1 mm; $\Phi_{air}$=−0.871025 mm$^{-1}$; $\Phi$=0.263158 mm$^{-1}$

| Face number | c | d | ne | vd |
|---|---|---|---|---|
| (Object point) | | ∞ | | |
| 1 (First face of first lens) | 1.077362 | 0.90 | 1.52692 | 56.2 |
| 2 (second face of first lens) | 0.826122 | 0.09 | | |
| 3 (Diaphragm) | 0 | 0.21 | | |
| 4 (first face of second lens) | −0.731407 | 1.10 | 1.52692 | 56.2 |
| 5 (second face of second lens) | −0.731552 | 0.0 | | |
| 6 (first face of cover glass) | 0 | 0.40 | 1.51825 | 64.2 |
| 7 (second face of cover glass) (Image surface) | 0 | 1.801 | | |

| Face number | K | A | B |
|---|---|---|---|
| 1 | 0.1851335 | −8.102357E−3 | −7.201421E−3 |
| 2 | 3.687250 | −2.216525E−2 | 1.300030E−1 |
| 4 | 0 | −2.408286E−1 | −1.297787 |
| 5 | 0.7139493 | 4.035899E−3 | −2.376845E−2 |

Under such conditions, $d_2/fl=0.079$, which satisfied the expression (1). In addition, $\Phi_{air}/\Phi=-3.310$, which satisfied the expression (2). Further, $(d_1+d_2+d_3)/fl=0.605$, which satisfied the expression (3).

Figure 16:
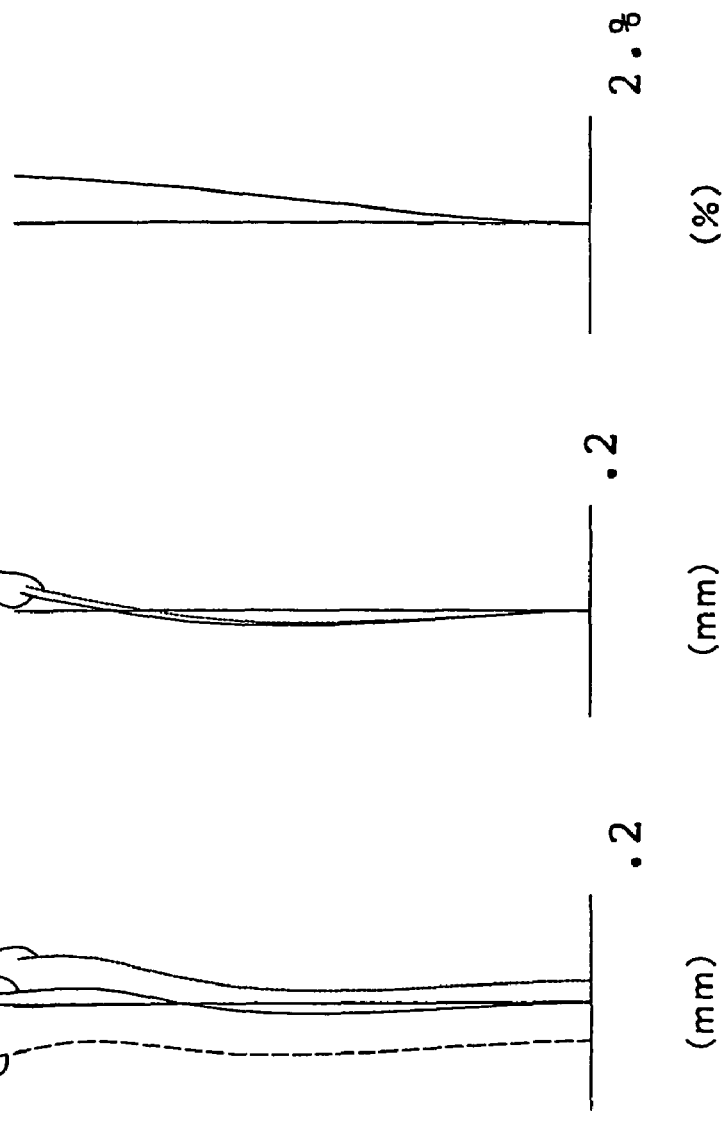
FIG. 16 is graphs showing the spherical aberration, the astigmatism and the distortion in the imaging lens system shown in FIG. 15.
Figure 17:
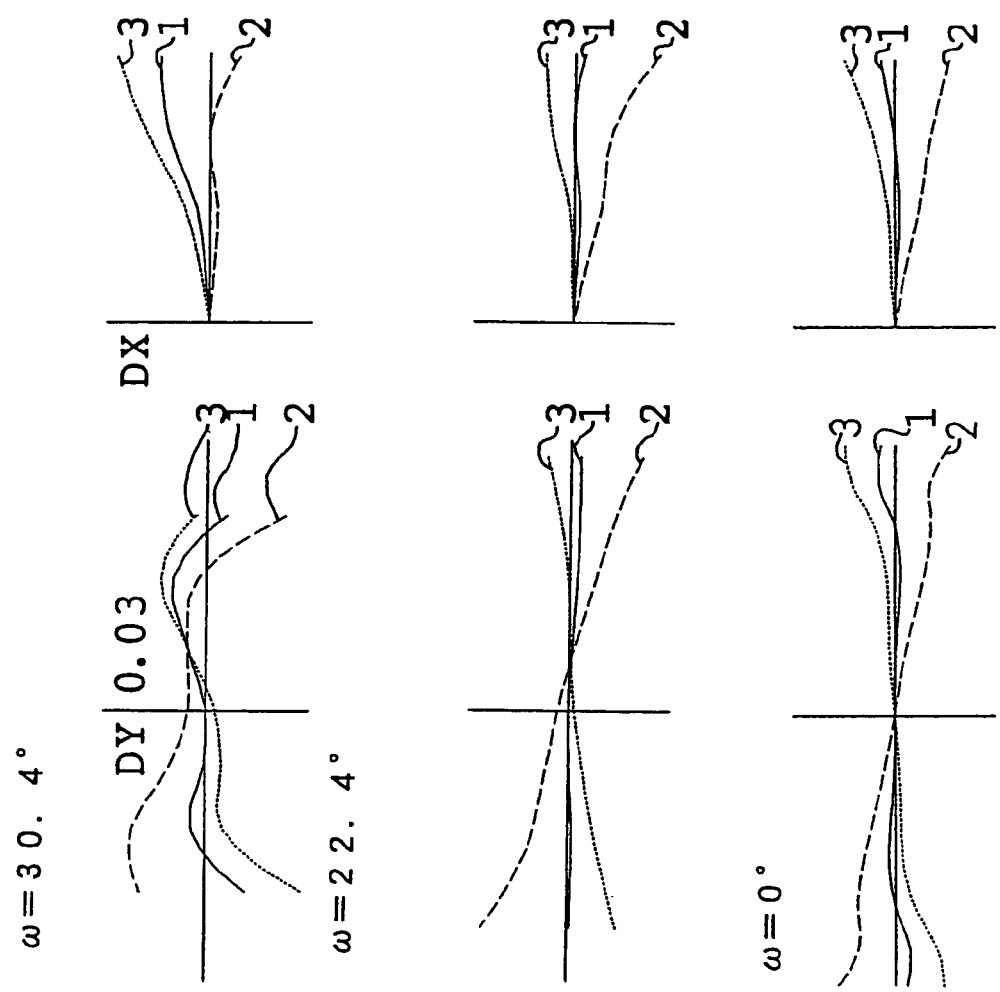
FIG. 17 is graphs each showing the lateral aberration in the imaging lens system shown in FIG. 15.

The spherical aberration, the astigmatism and the distortion in the imaging lens system 1 in the fifth example are shown in FIG. 16, and the lateral aberration is shown in FIG. 17.

As a result, it can be seen that any of the spherical aberration, the astigmatism, the distortion and the lateral aberration can be satisfied and hence, sufficient optical characteristics can be provided.

The present invention is not limited to the above-described examples, and various modifications may be made as required.

SIXTH EXAMPLE

Figure 18:
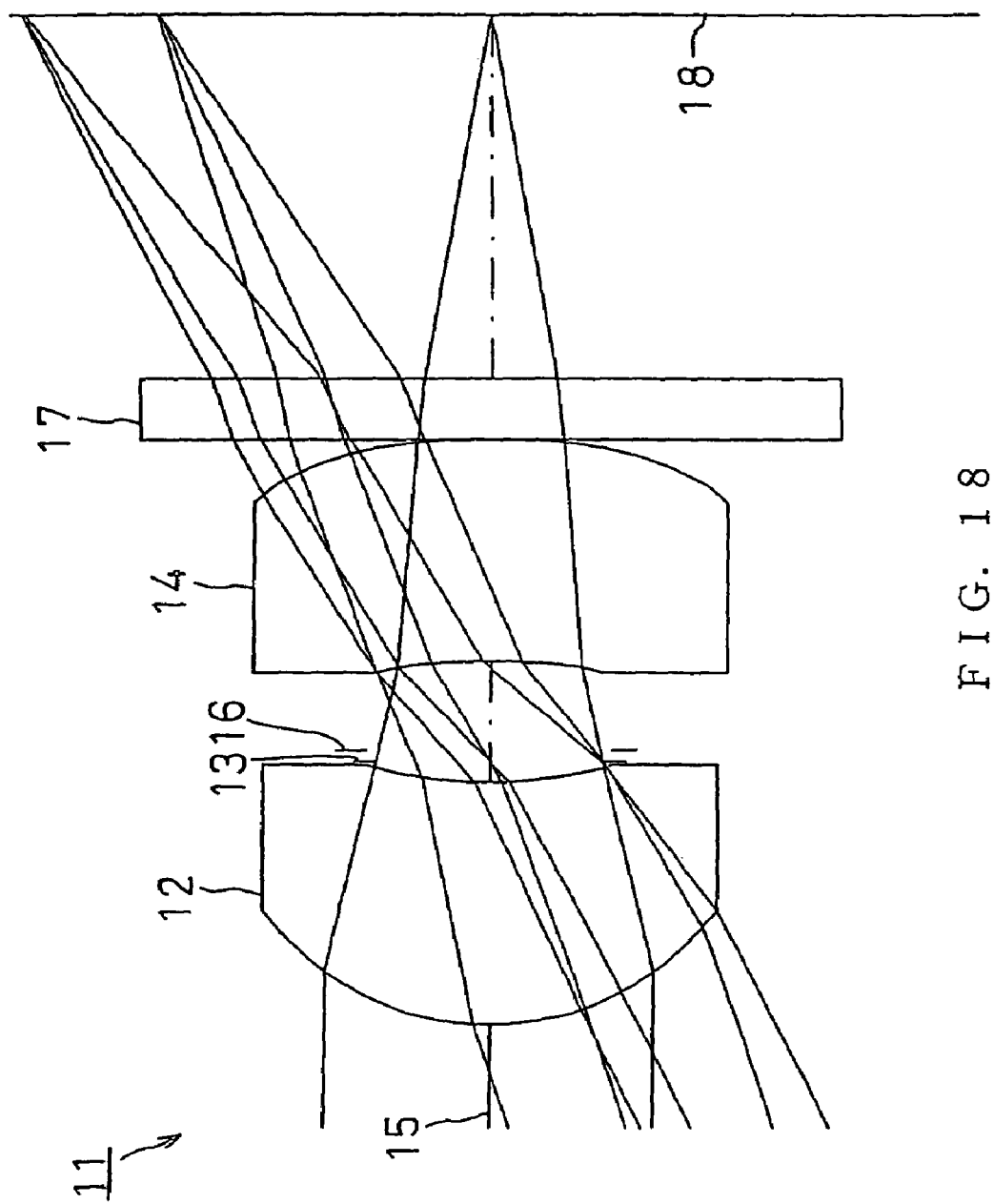
FIG. 18 is a schematic illustration showing the arrangement of a sixth example of the imaging lens system according to the present invention.

FIG. 18 shows a sixth example of the present invention. In this example, a diaphragm 13 is disposed in the vicinity of a second face of a first lens 12, and a light-amount limiting plate 16 is disposed between the diaphragm 13 and a first face of a second lens 14, as in the imaging lens system 11 having the arrangement shown in FIG. 2. A cover glass 17 as one example of a filter is disposed on the side of the second lens 14 closer to an image surface.

The imaging lens system 11 in the sixth example is set under the following conditions:

fl=4.54 mm; Fno=2.8; L=5.04 mm; $f_1$=4.37 mm; 2ω=55°; $d_1$=1.2 mm; $d_2$=0.5 mm; $d_3$=1.1 mm

| Face number | r | d | nd | vd |
|---|---|---|---|---|
| (Object point) | | | | |
| 1 (First face of first lens) | 1.333 | 1.200 | 1.525 | 56.0 |
| 2 (second face of first lens) | 2.200 | 0.100 | | |
| 3 (Diaphragm) | 0.000 | 0.150 | | |
| 4 (Light-amount limiting plate) | 0.000 | 0.350 | | |
| 5 (First face of second lens) | −4.400 | 1.100 | 1.525 | 56.0 |
| 6 (Second face of second lens glass) | −4.000 | 0.000 | | |
| 7 (First face of cover glass) | 0.000 | 0.300 | 1.516 | 64.1 |
| 8 (Second face of cover glass) (Image surface) | 0.000 | 1.778 | | |

| Face number | k | A | B | C | D |
|---|---|---|---|---|---|
| 1 | 0 | −7.6E−3 | −7.79E−5 | 5.5E−3 | −7.0E−3 |
| 2 | −1.0E+1 | 1.3E−1 | −7.30E−2 | 0 | 0 |
| 5 | 0 | −2.1E−1 | 2.10E−1 | −7.5E−1 | 0 |
| 6 | 4.6E | −5.4E−2 | −1.00E−2 | 1.5E−2 | −1.3E−2 |

Under such conditions, L/fl=1.11, which satisfied the expression (4). In addition, $f_1$/fl=0.96, which satisfied the expression (5). Further, $d_2$/$d_1$=0.468, which satisfied the expression (6). Yet further, $d_1$/fl=0.264, which satisfied the expression (8), and $d_3$/fl=0.242, which satisfied the expression (9). It is quite obvious that the entire length L (the length in air) of the lens system, which is the condition (L=5.04 mm) of this example, satisfies the expression (7).

Figure 19:
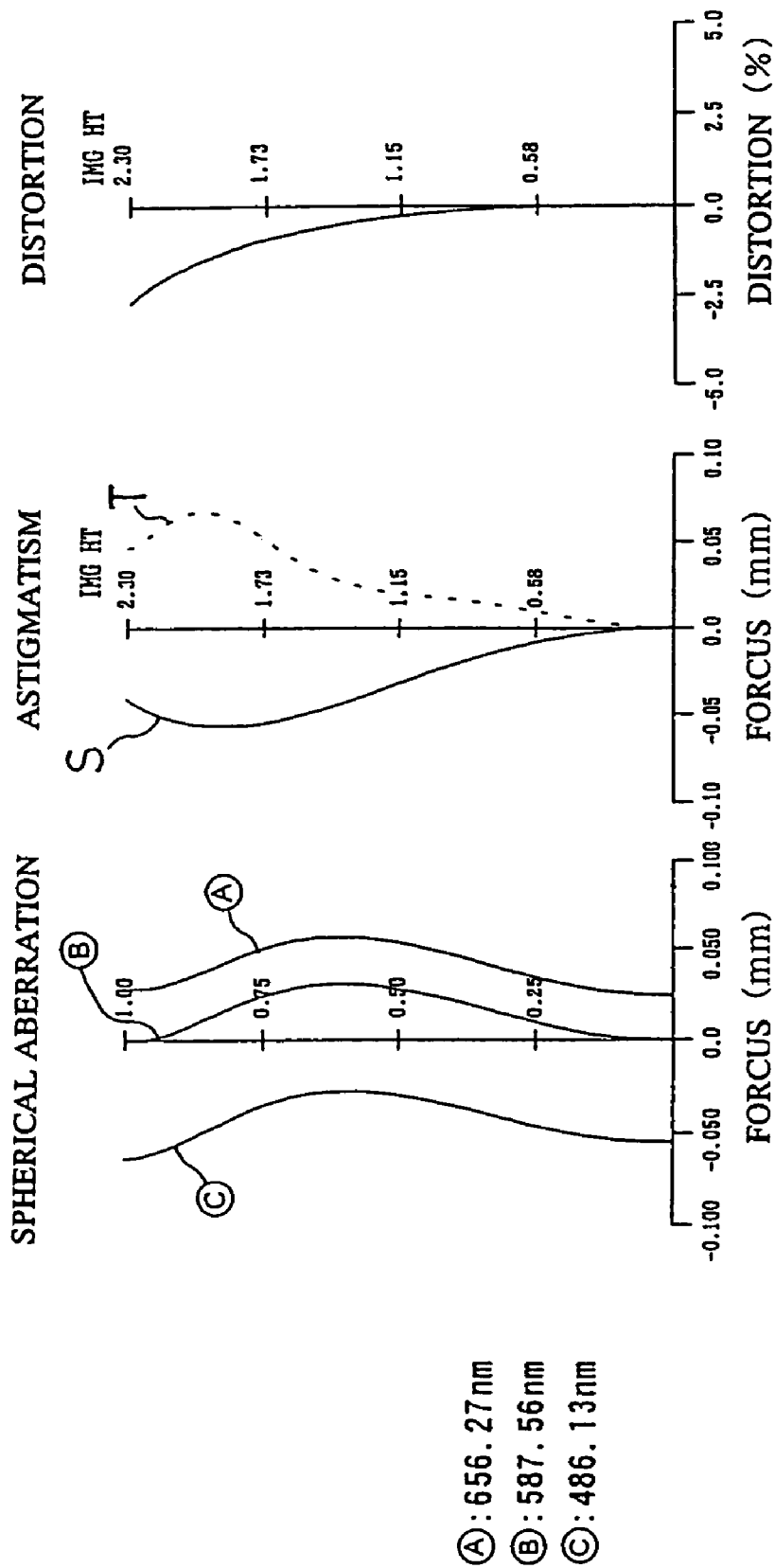
FIG. 19 is graphs showing the spherical aberration, the astigmatism and the distortion in the imaging lens system shown in FIG. 18.

The spherical aberration, the astigmatism and the distortion in the imaging lens system 11 in the sixth example are shown in FIG. 19.

As a result, it can be seen that any of the spherical aberration, the astigmatism and the distortion can be satisfied and hence, sufficient optical characteristics can be provided.

SEVENTH EXAMPLE

Figure 20:
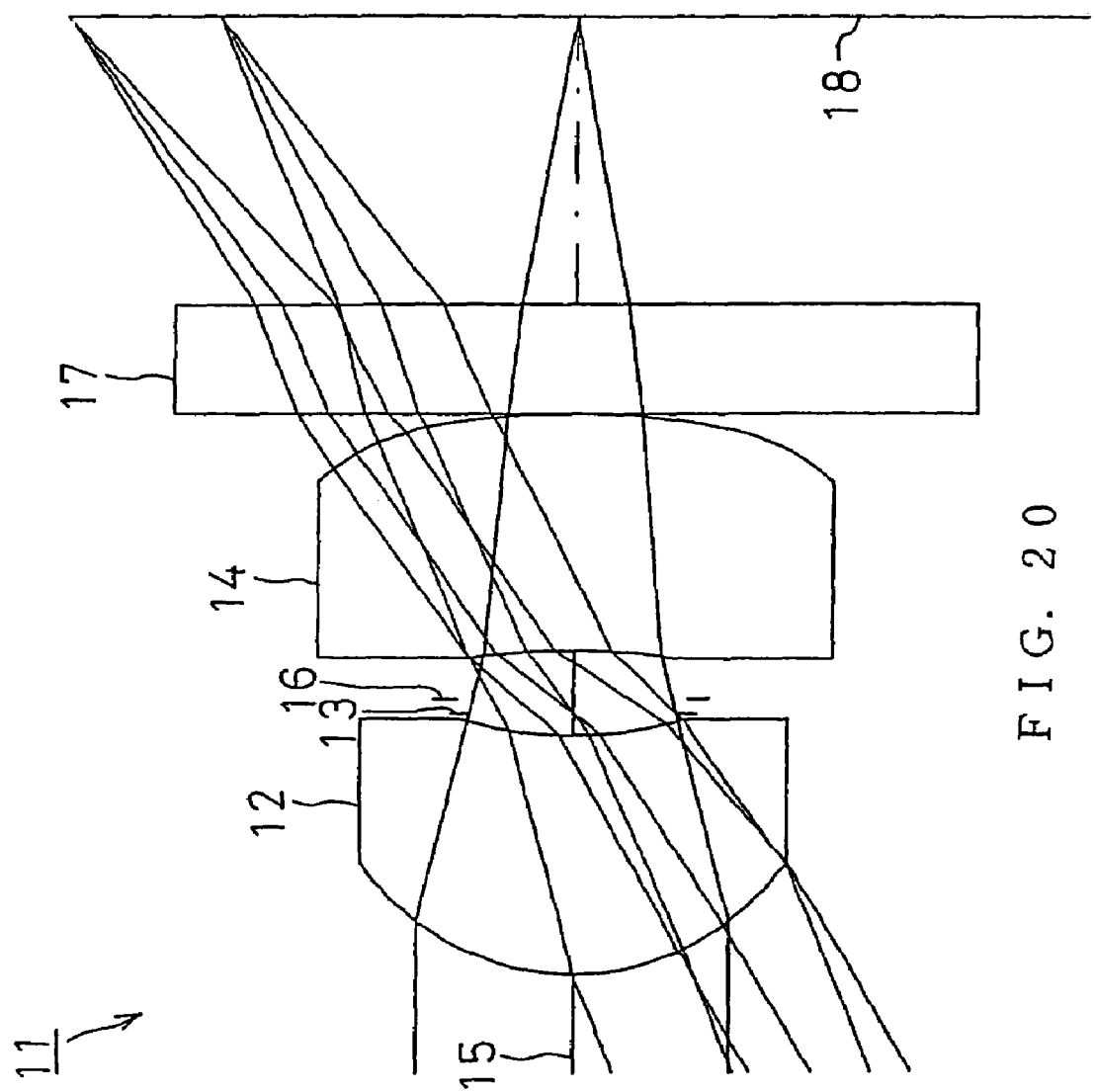
FIG. 20 is a schematic illustration showing the arrangement of a seventh example of the imaging lens system according to the present invention.

FIG. 20 shows a seventh example of the present invention. In this example, a diaphragm 13 is disposed in the vicinity of a second face of a first lens 12, and a light-amount limiting plate 16 is disposed between the diaphragm 13 and a first face of a second lens 14, as in the imaging lens system 11 having the arrangement shown in FIG. 2. A cover glass 17 as one example of a filter is disposed on the side of the second lens 14 closer to an image surface.

The imaging lens system 11 in the seventh example is set under the following conditions:

Lens Data fl=3.97 mm; Fno=2.8; L=4.64 mm; $f_1$=3.64 mm; 2ω=60°; $d_1$=1.1 mm; $d_2$=0.4 mm; $d_3$=1.1 mm

| Face number | r | d | nd | vd |
|---|---|---|---|---|
| (Object point) | | | | |
| 1 (First face of first lens) | 1.143 | 1.100 | 1.525 | 56.0 |
| 2 (second face of first lens) | 1.905 | 0.100 | | |
| 3 (Diaphragm) | 0.000 | 0.150 | | |
| 4 (Light-amount limiting plate) | 0.000 | 0.150 | | |
| 5 (First face of second lens) | −3.704 | 1.100 | 1.525 | 56.0 |
| 6 (Second face of second lens glass) | −3.922 | 0.000 | | |
| 7 (First face of cover glass) | 0.000 | 0.500 | 1.516 | 64.1 |
| 8 (Second face of cover glass) (Image surface) | 0.000 | 1.327 | | |

| Face number | k | A | B | C | D |
|---|---|---|---|---|---|
| 1 | 0 | −5.7E−3 | 1.8E−2 | −2.8E−2 | 1.8E−2 |
| 2 | 0 | 8.3E−2 | −1.6E−1 | 4.4E−1 | 0 |
| 5 | 0 | −2.2E−1 | 2.9E−2 | −9.5E−1 | 0 |
| 6 | 8.08 | −2.3E−2 | −2.7E−2 | 1.7E−2 | −1.0E−2 |

Under such conditions, L/fl=1.17, which satisfied the expression (4). In addition, $f_1$/fl=0.92, which satisfied the expression (5). Further, $d_2$/$d_1$=0.36, which satisfied the expression (6). Yet further, $d_1$/fl=0.277, which satisfied the expression (8), and $d_3$/fl=0.277, which satisfied the expression (9). It is quite obvious that the entire length L (the length in air) of the lens system, which is the condition (L=4.64 mm) of this example, satisfies the expression (7).

Figure 21:
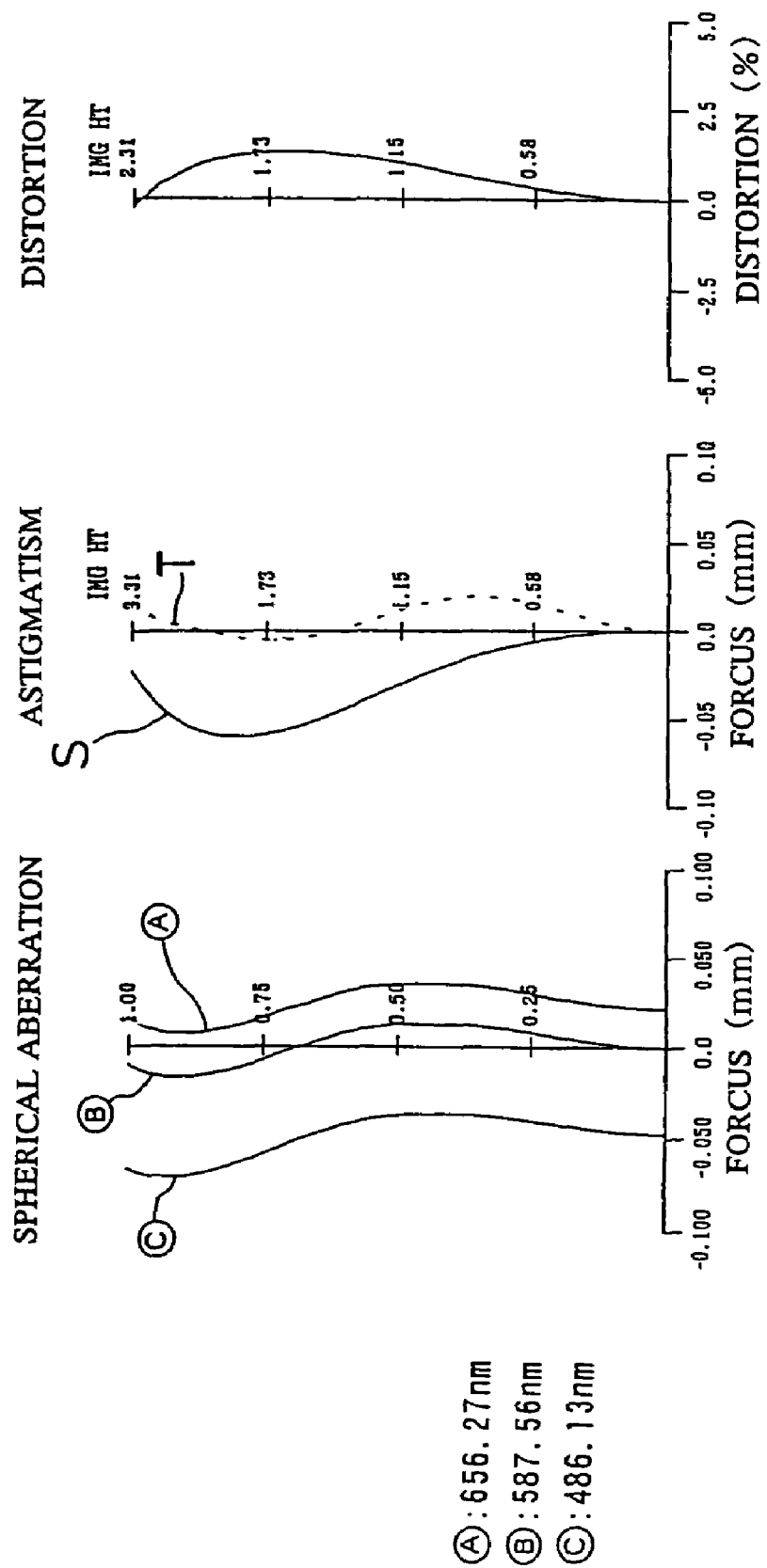
FIG. 21 is graphs showing the spherical aberration, the astigmatism and the distortion in the imaging lens system shown in FIG. 20.

The spherical aberration, the astigmatism and the distortion in the imaging lens system 11 in the sixth example are shown in FIG. 21.

As a result, it can be seen that any of the spherical aberration, the astigmatism and the distortion can be satisfied and hence, sufficient optical characteristics can be provided.

EIGHTH EXAMPLE

Figure 22:
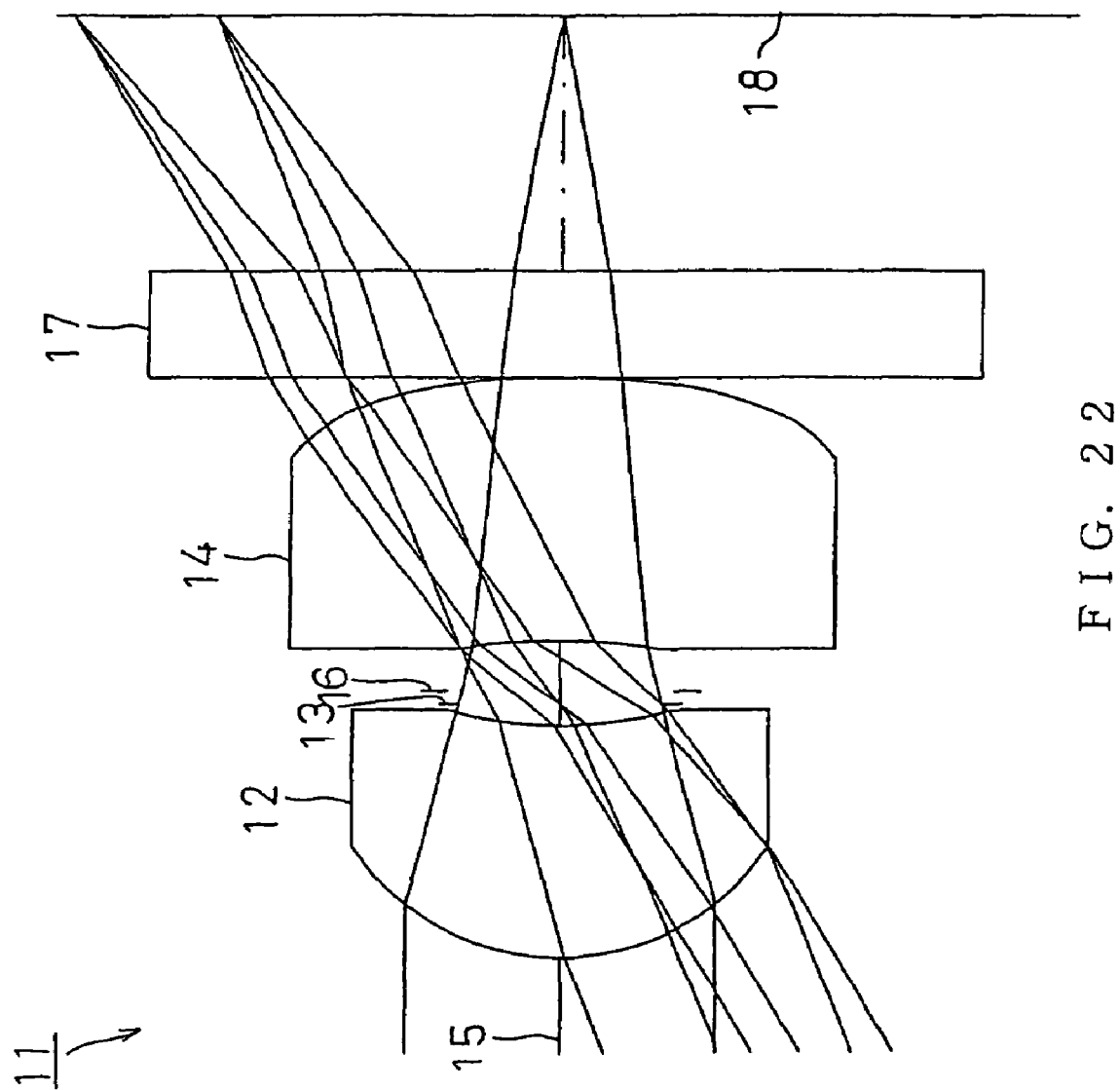
FIG. 22 is a schematic illustration showing the arrangement of an eighth example of the imaging lens system according to the present invention.

FIG. 22 shows an eighth example of the present invention. In this example, a diaphragm 13 is disposed in the vicinity of a second face of a first lens 12, and a light-amount limiting plate 16 is disposed between the diaphragm 13 and a first face of a second lens 14, as in the imaging lens system 11 having the arrangement shown in FIG. 2. A cover glass 17 as one example of a filter is disposed on the side of the second lens 14 closer to an image surface.

The imaging lens system 11 in the eighth example is set under the following conditions:

Lens Data fl=4.01 mm; Fno=2.8; L=4.29 mm; $f_1$=3.51 mm; 2ω=61°; $d_1$=1.1 mm; $d_2$=0.4 mm; $d_3$=1.25 mm

| Face number | r | d | nd | vd |
|---|---|---|---|---|
| (Object point) | | | | |
| 1 (First face of first lens) | 1.124 | 1.100 | 1.525 | 56.0 |
| 2 (second face of first lens) | 1.905 | 0.100 | | |
| 3 (Diaphragm) | 0.000 | 0.150 | | |
| 4 (Light-amount limiting plate) | 0.000 | 0.150 | | |
| 5 (First face of second lens) | −3.636 | 1.250 | 1.525 | 56.0 |
| 6 (Second face of second lens glass) | −4.545 | 0.000 | | |
| 7 (First face of cover glass) | 0.000 | 0.500 | 1.516 | 64.1 |
| 8 (Second face of cover glass) (Image surface) | 0.000 | 1.198 | | |

| Face number k | A | B | C | D |
|---|---|---|---|---|
| 1 | 0 | −8.3E-3 | 1.7E-2 | −2.6E-2 | 1.6E-2 |
| 2 | −1.7E+1 | 3.5E-1 | −2.3E-1 | 0 | 0 |
| 5 | 0 | −2.3E-1 | 1.1E-1 | −1.1 | 0 |
| 6 | 9.8 | −3.0E-2 | −2.4E-2 | 1.8E-2 | −9.3E-3 |

Under such conditions, $L/fl$ 1.07, which satisfied the expression (4). In addition, $f_1/fl=0.88$, which satisfied the expression (5). Further, $d_2/d_1=0.36$, which satisfied the expression (6). Yet further, $d_1/fl=0.274$, which satisfied the expression (8), and $d_3/fl=0.312$, which satisfied the expression (9). It is quite obvious that the entire length L (the length in air) of the lens system, which is the condition (L=4.29 mm) of this example, satisfies the expression (7).

Figure 23:
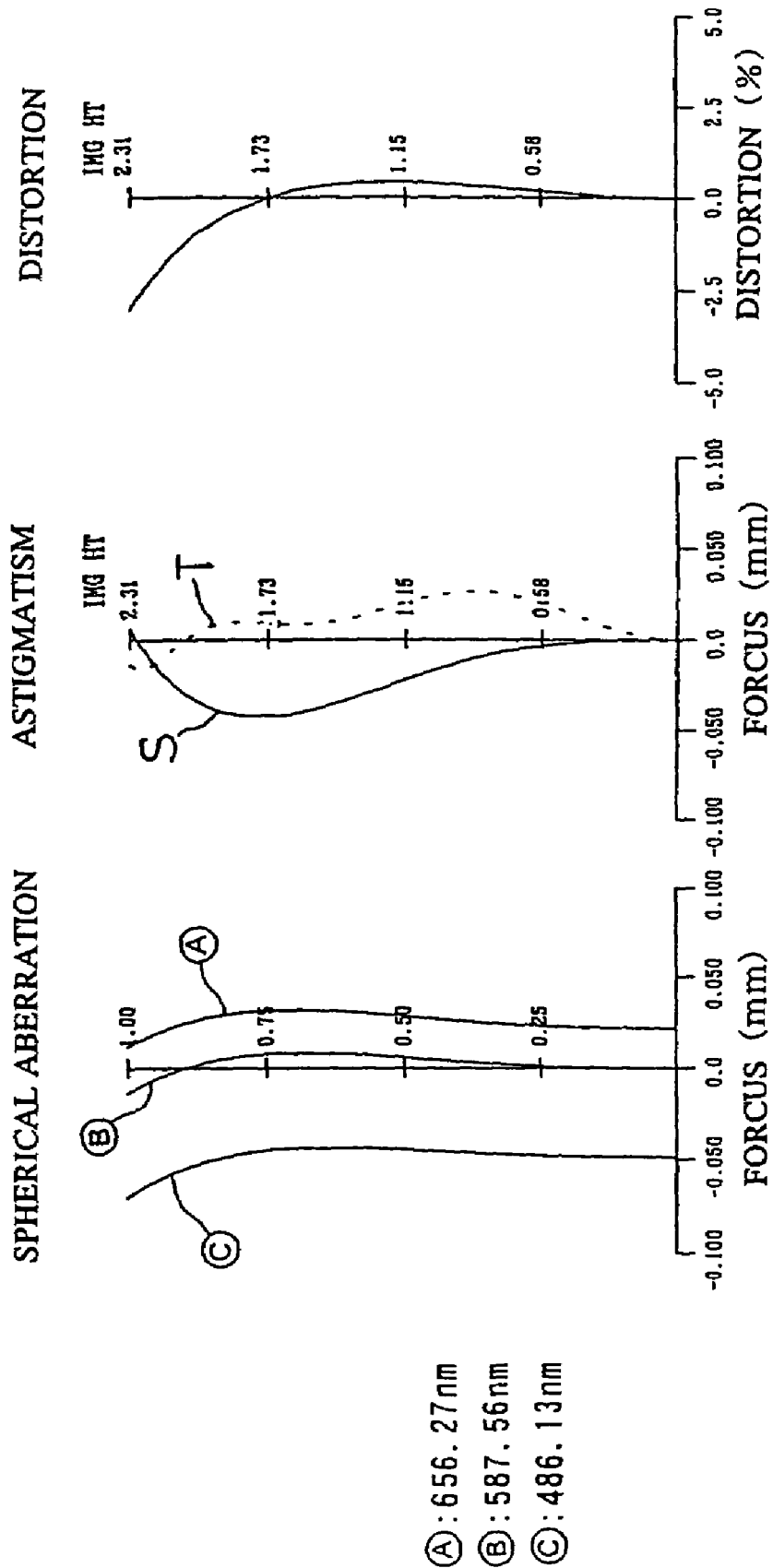
FIG. 23 is graphs showing the spherical aberration, the astigmatism and the distortion in the imaging lens system shown in FIG. 22.

The spherical aberration, the astigmatism and the distortion in the imaging lens system 11 in the eighth example are shown in FIG. 23.

As a result, it can be seen that any of the spherical aberration, the astigmatism and the distortion can be satisfied and hence, sufficient optical characteristics can be provided. It can be seen that even if the second lens 14 is a lens having a negative power, as in this example, good optical characteristics similar to those of the lens in the other example can be provided depending on the design.

NINTH EXAMPLE

Figure 24:
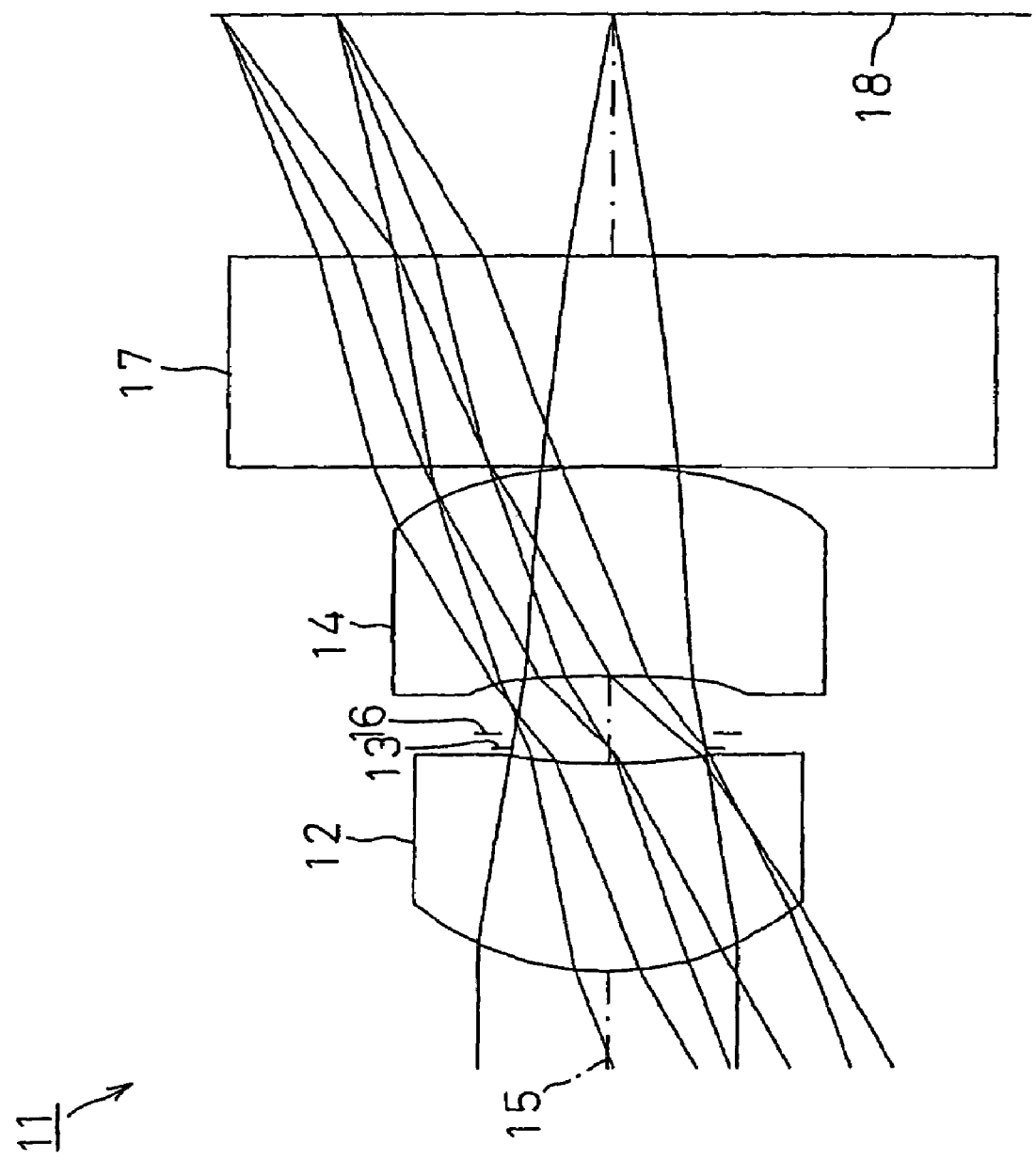
FIG. 24 is a schematic illustration showing the arrangement of a ninth example of the imaging lens system according to the present invention.

FIG. 24 shows a ninth example of the present invention. In this example, a diaphragm 13 is disposed in the vicinity of a second face of a first lens 12, and a light-amount limiting plate 16 is disposed between the diaphragm 13 and a first face of a second lens 14, as in the imaging lens system 11 having the arrangement shown in FIG. 2. A cover glass 17 as one example of a filter is disposed on the side of the second lens 14 closer to an image surface.

The imaging lens system 11 in the ninth example is set under the following conditions:

Lens Data
fl=2.39 mm; Fno=2.8; L=2.95 mm; $f_1$=2.98 mm; 2ω=58°; $d_1$=0.7 mm; $d_2$=0.4 mm; $d_3$=0.7 mm

| Face number | r | d | nd | vd |
|---|---|---|---|---|
| (Object point) | | | | |
| 1 (First face of first lens) | 0.952 | 0.700 | 1.525 | 56.0 |
| 2 (second face of first lens) | 1.818 | 0.050 | | |
| 3 (Diaphragm) | 0.000 | 0.150 | | |
| 4 (Light-amount limiting plate) | 0.000 | 0.100 | | |
| 5 (First face of second lens) | −5.000 | 0.700 | 1.525 | 56.0 |
| 6 (Second face of second lens glass) | −1.818 | 0.000 | | |
| 7 (First face of cover glass) | 0.000 | 0.700 | 1.516 | 64.1 |
| 8 (Second face of cover glass) (Image surface) | 0.000 | 0.788 | | |

| Face number k | A | B | C | D |
|---|---|---|---|---|
| 1 | 0 | −4.5E-2 | 1.5E-1 | −5.5E-1 | 2.0E-1 |
| 2 | 0 | −1.8E-1 | −7.0E-1 | 0 | 0 |
| 5 | 0 | −6.0E-1 | −8.1E-1 | −1.0E+1 | 0 |
| 6 | 3.1 | −3.0E-2 | −4.4E-1 | 7.9E-1 | −1.2 |

Under such conditions, $L/fl=1.23$, which satisfied the expression (4). In addition, $f_1/fl=1.25$, which satisfied the expression (5). Further, $d_2/d_1=0.43$, which satisfied the expression (6). Yet further, $d_1/fl=0.293$, which satisfied the expression (8), and $d_3/fl=0.293$, which satisfied the expression (9). It is quite obvious that the entire length L (the length in air) of the lens system, which is the condition (L=2.95 mm) of this example, satisfies the expression (7).

The spherical aberration, the astigmatism and the distortion in the imaging lens system 11 in the ninth example are shown in FIG. 25.

As a result, it can be seen that any of the spherical aberration, the astigmatism and the distortion can be satisfied and hence, sufficient optical characteristics can be provided.

The present invention is not limited to the above-described examples, and various modifications may be made as required.

As discussed above, according to the present invention, it is possible to realize an imaging lens system which is small-sized and lightweight and excellent in productivity, while maintaining good optical characteristics.

It is also possible to realize a small-sized imaging lens system in which an amount of light incident on a solid image sensor element can be utilized effectively.

Further, it is possible to realize a small-sized imaging lens system which is capable of exhibiting a further excellent optical performance under a situation where an amount of light is smaller, such as in the night or in a dark place.

Yet further, it is possible to realize a small-sized imaging lens system which has a wider angle of view and which is capable of shooting a landscape in a wider range and a large number of persons.

Yet further, it is possible to realize a small-sized imaging lens system which is reduced in entire length, while maintaining an increase in angle of view.

What is claimed is:

1. An imaging lens system used for forming an image of an object on an image taking surface of a solid image sensor element, comprising
a first lens made of a resin, which is a meniscus lens with its convex face turned toward the object side and having a positive power, a diaphragm, and a second lens made of a resin, which is a meniscus lens with its convex face turned toward an image surface side, said first lens, said diaphragm and said second lens being disposed sequentially in the named order from the side of the object toward the image surface, and wherein the following conditional expressions (4) to (9) are satisfied:

$$1.25 \times fl \geq L \geq 0.8 \times fl \quad (4)$$

$$1.26 \times fl \geq f_1 \geq 0.85 \times fl \quad (5)$$

$$0.8 \times d_1 \geq d_2 \geq 0.35 \times d_1 \quad (6)$$

$$L \leq 6.25 \text{ mm} \quad (7)$$

$$d_1 \geq 0.225 \times fl \quad (8)$$

$$d_3 \geq 0.225 \times fl \quad (9)$$

wherein L is a distance of the entire length of the lens system (a distance from a surface of said first lens on the side of the object to the image taking surface (a length in air)); fl is a focal length of the entire lens system; $f_1$ is a focal length of said first lens; $d_1$ is a thickness of the center of said first lens; $d_2$ is a distance between said first and second lenses on an optical axis; and $d_3$ is a thickness of the center of said second lens.

2. An imaging lens system according to claim 1, wherein said second lens is formed as a meniscus lens having a positive power.

3. An imaging lens system according to claim 1 or 2, wherein said diaphragm may be disposed to lie at a location displaced toward said first lens from a middle point of a line segment on the optical axis, which connects a surface of said first lens on the side of an image surface and a surface of said second lens on the side of the object to each other.

4. An imaging lens system according to any of claims 1 to 2, wherein a brightness of an optical system is defined so that the following expression is established:

$$4.0 > Fno \quad (10)$$

wherein Fno is a brightness of the optical system.

5. An imaging lens system according to any of claims 4 to 2, wherein an angle of diagonal view is defined so that the following expression is established:

$$2\omega \geq 50° \quad (11)$$

wherein $2\omega$ is an angle of diagonal view.

6. An imaging lens system according to any of claims 4 to 2, wherein the following conditional expression is satisfied:

$$Fl \leq 5.0 \text{ mm} \quad (12).$$

7. An imaging lens system according to claim 3, wherein a brightness of an optical system is defined so that the following expression is established:

$$4.0 > Fno \quad (10)$$

wherein Fno is a brightness of the optical system.

8. An imaging lens system according to claim 3, wherein an angle of diagonal view is defined so that the following expression is established:

$$2\omega \geq 50° \quad (11)$$

wherein $2\omega$ is an angle of diagonal view.

9. An imaging lens system according to claim 4, wherein an angle of diagonal view is defined so that the following expression is established:

$$2\omega \geq 50° \quad (11)$$

wherein $2\omega$ is an angle of diagonal view.

10. An imaging lens system according to claim 3, wherein the following conditional expression is satisfied:

$$Fl \leq 5.0 \text{ mm} \quad (12).$$

11. An imaging lens system according to claim 4, wherein the following conditional expression is satisfied:

$$Fl \leq 5.0 \text{ mm} \quad (12).$$

12. An imaging lens system according to claim 5, wherein the following conditional expression is satisfied:

$$Fl \geq 5.0 \text{ mm} \quad (12).$$

* * * * *